US007814924B2

(12) United States Patent
McGill

(10) Patent No.: US 7,814,924 B2
(45) Date of Patent: Oct. 19, 2010

(54) SEISMIC SAFETY VALVE AND VALVE ACTUATOR

(76) Inventor: James C. McGill, 4312 Lisa Dr., Union City, CA (US) 94587

( * ) Notice: Subject to any disclaimer, the term of this patent is extended or adjusted under 35 U.S.C. 154(b) by 1035 days.

(21) Appl. No.: 11/437,667

(22) Filed: May 22, 2006

(65) Prior Publication Data
US 2006/0278269 A1 Dec. 14, 2006

Related U.S. Application Data

(63) Continuation-in-part of application No. PCT/US2004/038873, filed on Nov. 22, 2004.

(60) Provisional application No. 60/523,320, filed on Nov. 20, 2003.

(51) Int. Cl.
*F16K 17/36* (2006.01)
(52) U.S. Cl. ............... 137/39; 251/74; 251/294
(58) Field of Classification Search ............ 137/38, 137/39, 46; 251/326, 327, 129.03, 129.2, 251/294, 74
See application file for complete search history.

(56) References Cited

U.S. PATENT DOCUMENTS

| 613,990 | A | | 11/1898 | Guyenot |
| 1,444,576 | A | * | 2/1923 | Williamson ............... 251/67 |
| 2,017,274 | A | | 10/1935 | Breitenstein |
| 2,206,067 | A | | 7/1940 | Waltamath |
| 2,215,044 | A | | 9/1940 | Kammerdiner |
| 2,264,655 | A | * | 12/1941 | Brackmann ............... 251/67 |
| 2,579,656 | A | | 12/1951 | Douglas et al. |
| 2,601,304 | A | | 6/1952 | Lanc |
| 2,637,331 | A | | 5/1953 | Sullivan |
| 2,638,106 | A | | 5/1953 | Shiels |
| 2,927,982 | A | | 3/1960 | Slough |
| 3,042,361 | A | | 7/1962 | Garrott |
| 3,044,741 | A | | 7/1962 | Grove |
| 3,082,627 | A | * | 3/1963 | Yeo et al. ............... 251/67 |
| 3,238,969 | A | | 3/1966 | Champion |

(Continued)

FOREIGN PATENT DOCUMENTS

CN           2221696          3/1996

(Continued)

OTHER PUBLICATIONS

Chinese Office Action issued Nov. 2, 2007 in corresponding Chinese Application No. 200480034450.7 (with English translation).

(Continued)

*Primary Examiner*—Stephen Hepperle
(74) *Attorney, Agent, or Firm*—Wenderoth, Lind & Ponack, L.L.P.

(57) ABSTRACT

A safety valve is positioned in supply plumbing that supplies a fluid medium such as natural gas to a point of use structure such as a home. A mechanical actuator is provided remote from the safety valve but mechanically connected to the safety valve. This allows the actuator to be positioned, for example, directly on the point of use structure, avoiding the need for separate bracing for the valve. The valve can be provided with a tee fitting or can be a separate gate valve. The mechanical actuator can be actuated by seismic disturbance, manually, or by activation by remote sensor or home security system.

5 Claims, 30 Drawing Sheets

U.S. PATENT DOCUMENTS

| | | | |
|---|---|---|---|
| 3,245,257 A | 4/1966 | Anderson | |
| 3,256,735 A | 6/1966 | Smith | |
| 3,266,308 A | 8/1966 | Howarth | |
| 3,272,009 A | 9/1966 | Leopold, Jr. et al. | |
| 3,273,855 A | 9/1966 | Wells | |
| 3,296,859 A | 1/1967 | Stewart | |
| 3,606,242 A | 9/1971 | Lanthrop, II | |
| 3,614,061 A * | 10/1971 | Fitzpatrick | 251/327 |
| 3,677,291 A | 7/1972 | Laws | |
| 3,747,616 A | 7/1973 | Lloyd | |
| 3,768,497 A | 10/1973 | Mueller | |
| 3,783,887 A | 1/1974 | Shoji | |
| 3,805,818 A | 4/1974 | Yamada | |
| 3,842,852 A | 10/1974 | Bair | |
| 3,878,858 A | 4/1975 | Yamada | |
| 3,946,754 A | 3/1976 | Cook | |
| 3,995,651 A | 12/1976 | Adams | |
| 4,007,643 A * | 2/1977 | Matsushita | 137/38 |
| 4,028,510 A | 6/1977 | Yamaura et al. | |
| 4,098,284 A | 7/1978 | Yamada | |
| 4,103,697 A | 8/1978 | Kiesow | |
| 4,165,758 A | 8/1979 | Douce | |
| 4,174,729 A | 11/1979 | Roark et al. | |
| 4,185,507 A | 1/1980 | Domyan | |
| 4,207,912 A | 6/1980 | Ichikawa | |
| 4,212,313 A | 7/1980 | Winters | |
| 4,245,814 A | 1/1981 | Shimizu | |
| 4,261,379 A | 4/1981 | Berry | |
| 4,327,760 A | 5/1982 | Lancaster | |
| 4,331,171 A | 5/1982 | Novi | |
| 4,349,042 A | 9/1982 | Shimizu | |
| 4,382,449 A | 5/1983 | Nelson | |
| 4,475,565 A | 10/1984 | Keller et al. | |
| 4,485,832 A | 12/1984 | Plemmons et al. | |
| 4,603,591 A | 8/1986 | Sibley et al. | |
| 4,640,303 A | 2/1987 | Greenberg | |
| 4,671,486 A | 6/1987 | Giannini | |
| 4,688,592 A | 8/1987 | Tibbals, Jr. | |
| 4,750,705 A | 6/1988 | Zippe | |
| 4,782,848 A | 11/1988 | Sibley et al. | |
| 4,785,842 A | 11/1988 | Johnson, Jr. | |
| 4,799,505 A | 1/1989 | Nowell | |
| 4,817,657 A | 4/1989 | Kovacs | |
| 4,844,113 A | 7/1989 | Jones | |
| 4,903,720 A | 2/1990 | McGill | |
| 4,920,999 A | 5/1990 | Asbra et al. | |
| 4,960,146 A | 10/1990 | Morris | |
| 5,029,601 A | 7/1991 | Reschke et al. | |
| 5,042,528 A | 8/1991 | England et al. | |
| 5,050,629 A | 9/1991 | Willoughby | |
| 5,052,429 A | 10/1991 | Yoo | |
| 5,065,718 A | 11/1991 | Suzuki et al. | |
| 5,074,327 A | 12/1991 | Reid | |
| 5,078,172 A | 1/1992 | Gonzalez | |
| 5,115,829 A | 5/1992 | Franzke | |
| 5,119,841 A | 6/1992 | McGill | |
| 5,143,110 A | 9/1992 | Simpson | |
| 5,148,829 A | 9/1992 | Deville | |
| 5,169,125 A * | 12/1992 | Bailey | 251/327 |
| 5,209,454 A | 5/1993 | Engdahl et al. | |
| 5,325,881 A | 7/1994 | Hunter et al. | |
| 5,351,706 A | 10/1994 | Banks | |
| 5,409,031 A | 4/1995 | McGill et al. | |
| 5,437,300 A | 8/1995 | Winnie et al. | |
| 5,584,465 A | 12/1996 | Ochsenreiter | |
| 5,694,960 A | 12/1997 | Turk et al. | |
| 5,794,667 A | 8/1998 | Payne et al. | |
| 5,810,330 A | 9/1998 | Eith et al. | |
| 5,960,807 A | 10/1999 | Reyman | |
| 5,992,439 A | 11/1999 | McGill | |
| 5,999,087 A | 12/1999 | Gunton | |
| 6,048,288 A | 4/2000 | Tsujii et al. | |
| 6,085,772 A * | 7/2000 | McGill et al. | 137/39 |
| 6,112,619 A * | 9/2000 | Campbell | 74/553 |
| 6,367,570 B1 | 4/2002 | Long, III et al. | |
| 6,491,062 B1 | 12/2002 | Croft | |
| 6,705,340 B1 | 3/2004 | McGill et al. | |
| 6,857,918 B1 | 2/2005 | Lebreux et al. | |
| 6,938,637 B2 | 9/2005 | McGill et al. | |
| 7,338,335 B1 | 3/2008 | Messano | |
| 7,458,387 B2 | 12/2008 | McGill | |
| 2004/0149334 A1 | 8/2004 | McGill et al. | |
| 2005/0218856 A1 | 10/2005 | Okano | |
| 2006/0076053 A1 | 4/2006 | McGill | |
| 2006/0278269 A1 | 12/2006 | McGill | |
| 2009/0065068 A1 | 3/2009 | McGill | |

FOREIGN PATENT DOCUMENTS

| | | |
|---|---|---|
| CN | 2440992 | 8/2001 |
| JP | 57-12172 | 1/1982 |

OTHER PUBLICATIONS

International Search Report issued Jul. 29, 2009 in corresponding International Application No. PCT/US2009/045904.

Written Opinion of the International Searching Authority issued Jul. 29, 2009 in corresponding International Application No. PCT/US2009/045904.

* cited by examiner

SEISMIC SAFETY VALVE AND VALVE ACTUATOR

REFERENCE TO RELATED APPLICATIONS

This application is a Continuation-In-Part of International Application No. PCT/US2004/038873, filed Nov. 22, 2004, which in turn claims benefit of priority under 35 U.S.C. §119 to prior Provisional Application Ser. No. 60/523,320, filed Nov. 20, 2003.

BACKGROUND OF THE INVENTION

1. Field of the Invention

The present application relates to seismic safety valves and a valve actuator therefore. In particular, it relates to valves used to shutoff the supply of gas to a structure in the event of an earthquake and how such valves are actuated.

2. State of the Prior Art

Various devices have been known in the prior art for shutting off gas systems in the event of a seismic disturbance. For example, U.S. Pat. Nos. 4,311,171, 4,565,208, and 4,475,565 all illustrate different types of valves designed to shutoff the flow of gas in the event of a seismic disturbance.

Applicant's own prior valves and systems include those in U.S. Pat. Nos. 4,903,720, 5,119,841, 5,409,031, 6,085,772 and 6,705,340. These different patents address various concerns with respect to shutting off the flow of natural gas to a point of use in the event of a seismic disturbance. These patents also recognize that other disturbances might be appropriate in triggering the shutoff of gas. They have in common the concept of shutting off the flow of gas exterior to the point of use structure. For example, the shutoff valve may be positioned at or near the gas meter on the exterior of the point of use structure.

The present inventor has recognized, however, that in some prior valve installations that are currently on the market, a number of problems exist. For example, in prior valves, the sensor mechanism that detects seismic activity to trigger the shutoff of the valve is incorporated with the valve itself. This then requires the valve to be level. It further requires the valve itself to be braced to the structure, i.e. to be directly fixed with the structure that is the point of use, for proper sensing of the seismic activity. This requires rigid bracing to be provided, which increases the likelihood of the piping breaking before the valve in the event of seismic activity. The labor cost is thus high in the installation of the valve.

Prior art valves also require additional fittings to be installed, are not adaptable to "smart" controls, and are limited to the earthquake market only. Further, they will not work with water. The meter usually needs to be displaced for the installation, and the valve structure itself often results in poor flow of the gas.

Additionally, the present inventor has recognized that the prior art valves do not have such desirable features as a manual shutoff. They also lack a positive "off"; in other words, the valve can reset by itself after shutting off. The status indicators of the prior art valves also tend to be hard to read, and there tend to be too many false triggers of the valve.

SUMMARY OF THE INVENTION

Accordingly, the object of the present invention is to provide a seismic safety valve and an actuator for the valve that addresses the above problems recognized with the prior art. In particular, the objects of the invention are to reduce cost, reduce installation time, and reduce the amount of space required for the installation. A particular object of the invention is to provide a valve arrangement in which bracing will not be required, as with the prior art. Further objects of the invention are to ensure a full flow of gas through the valve, to make the valve adaptable to smart controls and thus more usable with different types of systems on the market, and to have the valve work for water.

Further objects of the present invention are to provide a valve arrangement that can be readily expanded to different sizes for different types of installations, to provide a valve with an easy to read status indicator, which can have a remote status option, and to provide a valve in which positive shutoff of the valve results so that the valve will not reset by itself.

The above objects according to the present invention are achieved by a valve arrangement in which a safety valve is located in supply plumbing used for supplying a fluid medium to a point of use structure. A mechanical actuator to actuate the safety valve is mechanically connected to the safety valve and located remotely from the safety valve. The mechanical actuator is preferably fixed to the point of use structure and connected to the safety valve by a flexible cable. The valve is spring biased toward a closed position but held in an open position by the flexible cable. The mechanical actuator holds the cable in a retracted position which corresponds to the open position of the safety valve, and can be actuated to release the cable so that the safety valve closes.

The supply plumbing can include a tee, with the safety valve located in the tee. The tee has three openings, and the valve is mounted in one of the openings, with an inlet and an outlet for the fluid being formed by the other two of the openings. The valve member is held in an open position by the mechanical actuator, and a spring biases the valve member toward a closed position in which the outlet is closed off from the inlet. An actuator housing is connected to the tee opening, with a valve member being mounted at an interior end of the actuated housing and the spring being housed within the actuator housing, the flexible cable being connected to the valve member.

The supply plumbing could alternatively be two supply pipes with respective pipe ends between which the safety valve is provided. In this instance, the safety valve preferably comprises a gate valve. The gate valve includes a gate valve housing and a gate in the housing held in the open position by the mechanical actuator and a spring biasing the gate toward the closed position, in which position the two supply pipes are closed off from each other. The gate valve housing has an inner seal and an outer seal surrounding a fluid flow passage. The gate is slidable between the seals to a position in which the fluid flow passage is closed.

According to a particularly advantageous aspect of the present invention, the gate valve housing is connected to the two supply pipes by respective connection arrangements each comprising a union nut threaded to the gate valve housing, an insert that engages the union nut and threads on the supply pipes engaging the respective inserts. Each union nut is threaded to the gate valve housing and a gate valve housing side of the union nut, and has a flange that engages an insert flange on the insert on a supply pipe side of the union nut. The insert is threaded to the threads of the pipe on a gate valve housing side of the insert. This arrangement minimizes the space between the ends of the respective supply pipes by reducing the amount of space taken up by the connections.

The mechanical actuator comprises a cable holder that is operable to hold the flexible cable in a valve open position and a cable release mechanism that is operable to release the cable holder from holding the flexible cable in the open position so as to allow the safety valve to close. The cable holder is preferably a movable member that is held by a detent so as to hold the flexible cable in the valve open position. The cable release mechanism is operable to release the movable member from being held by the detent. The detent comprises a detent member that is held in place by a lever to hold the movable member. The cable release mechanism comprises a releasable latch that is operable first to hold the lever in place so as to hold the movable member, and second to release the lever.

The cable release mechanism preferably includes a sensor and a latch release that is operable to release the latch in response to activation of the sensor. A manual off trigger is also preferably provided in order to manually operate the latch and close the safety valve. The manual trigger is connected with a solenoid coil so that it can also be remotely operable in response to an electronic signal.

The sensor preferably comprises a ball movable in response to seismic activity and a flapper that is activated in response to movement of the ball so as to engage and release the latch. The movable member preferably has a cam member which can engage and reset the flapper and the ball upon movement of the movable member after it is released from being held by the detent.

The detent member can comprise a locking lever that engages with the locking surface of a housing of the mechanical actuator. Alternatively, the detent member can be a protrusion on the lever that engages with a locking surface of a housing of the mechanical actuator. As a further alternative, the detent member can include a ball that is held in place by the lever so as to hold the movable member by engagement with a fixed part of the mechanical actuator.

The mechanical actuator also preferably has a reset handle that is connected with the movable member and is operable to reset the movable member so as to be held by the detent. This pulls the valve member against its bias with the flexible cable to the valve open position. Preferably the movable member is a rotatable hub and the reset handle is connected with this hub. According to a further preferred feature of the invention, the reset handle preferably has an off or on indicator on it, is rotatable with the hub, and covers the other of the off or on indicator in one of its set positions, i.e. either the closed position or the open position, so as to be able to indicate the status of the valve.

According to the above invention, by having the mechanical actuator remote from the safety valve itself, the safety valve does not need to be braced with respect to the point of use structure. This reduces the installation time, and eliminates the necessity for bracing. For example, the actuator housing can be directly mounted on the point of use structure without the need for any bracing and without the need for the installation time required for such additional bracing.

By either using the service tee for the valve, or by using a gate valve which takes up a very small amount of space, the amount of space required for the valve can be reduced. Further, by either using the service tee or the gate valve which does not change the direction of flow or reduce the flow passage, a full flow of gas is ensured through the valve. The valve is adaptable to "smart" controls by being responsive to an outside electronic signal to shutoff, even though the valve itself is basically mechanical. This allows the valve to be used with more modern integrated control and security systems for homes and other structures.

Further, the mechanical actuator according to the present invention can be used together with safety valves of various sizes. That is, the actuator itself is not dependent upon the size of the valve that is used with it.

The present invention further provides an easy to read status indicator. The valve according to the invention also provides a positive off position that will not reset by itself in view of the biasing of the valve member to the closed position and the holding of the mechanical actuator in such position until positively reset.

BRIEF DESCRIPTION OF THE DRAWINGS

The above and further aspects of the present invention will become clear from the following detailed description of preferred embodiments of the invention, taken in conjunction with the accompanying drawings, in which.

DETAILED DESCRIPTION OF THE PREFERRED EMBODIMENTS

Figure 1:
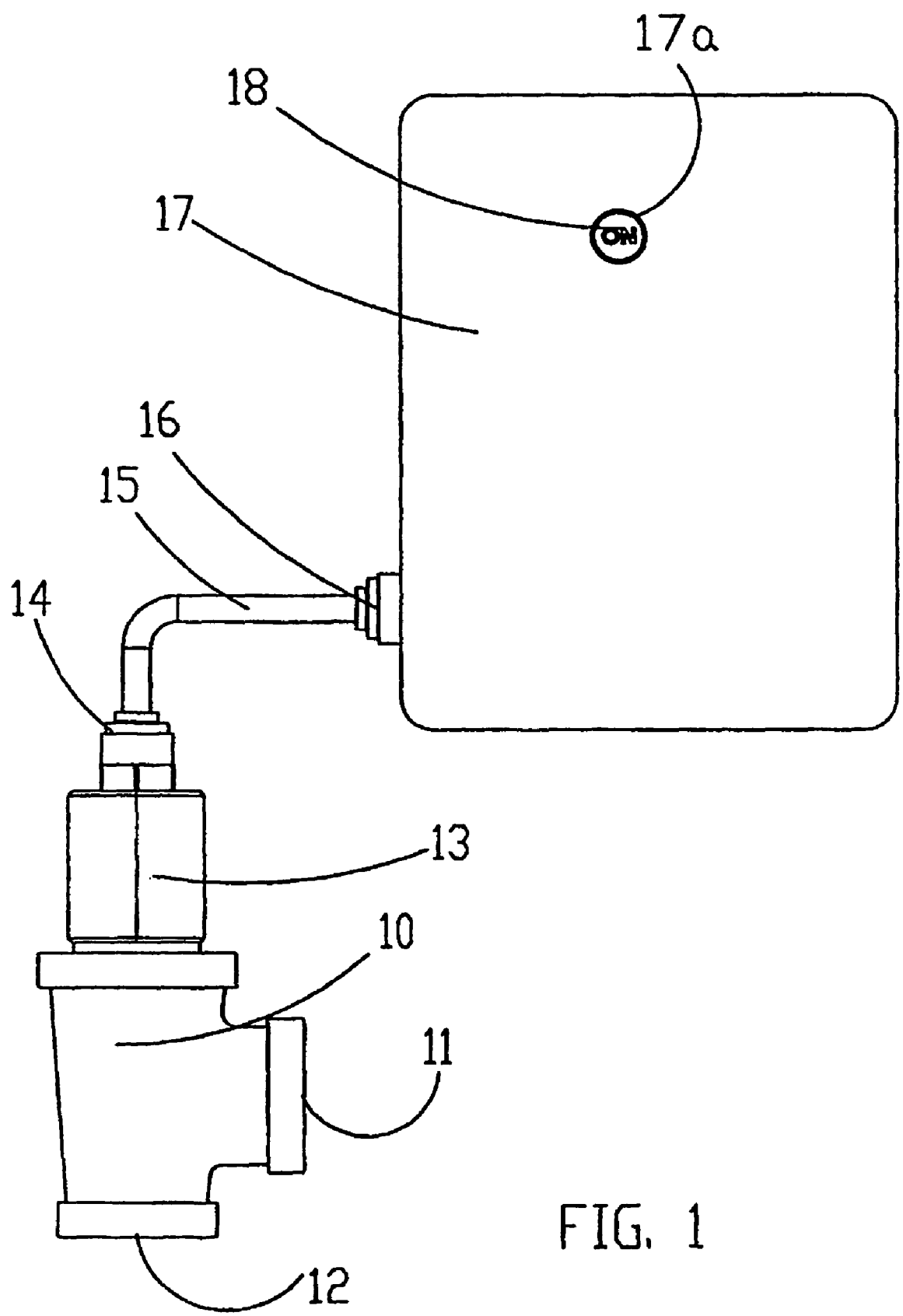
FIG. 1 is a schematic view of a safety valve and valve actuator employing a "tee valve"

FIG. 1 generally illustrates a safety valve located in supply plumbing for supplying a fluid medium to a point of use structure and a mechanical actuator to actuate the safety valve. In this embodiment the safety valve is embodied in a "tee" which includes a gas inlet 11 and a gas outlet 12. As can be seen from FIG. 3, a housing 13 mounts the valve components to the tee 10.

Turning back to FIG. 1, a mechanical actuator 17 is generally illustrated and is mechanically connected to the housing 13 but located remotely from the safety valve. As discussed above, this allows the mechanical actuator, for example, to be directly mounted on the structure so as to avoid the need for bracing, while allowing the valve to be mounted in the supply plumbing. This avoids the need for bracing the valve itself.

The valve includes at least valve member or stopper 20 mounted with a piston 21 and biased by a spring 22 toward the outlet 12. A valve seal 19 is provided at the outlet to seal the valve closed when the stopper 20 is biased by the spring 22 into contact with the seal 19. Note the illustration of FIG. 5.

Figure 3:
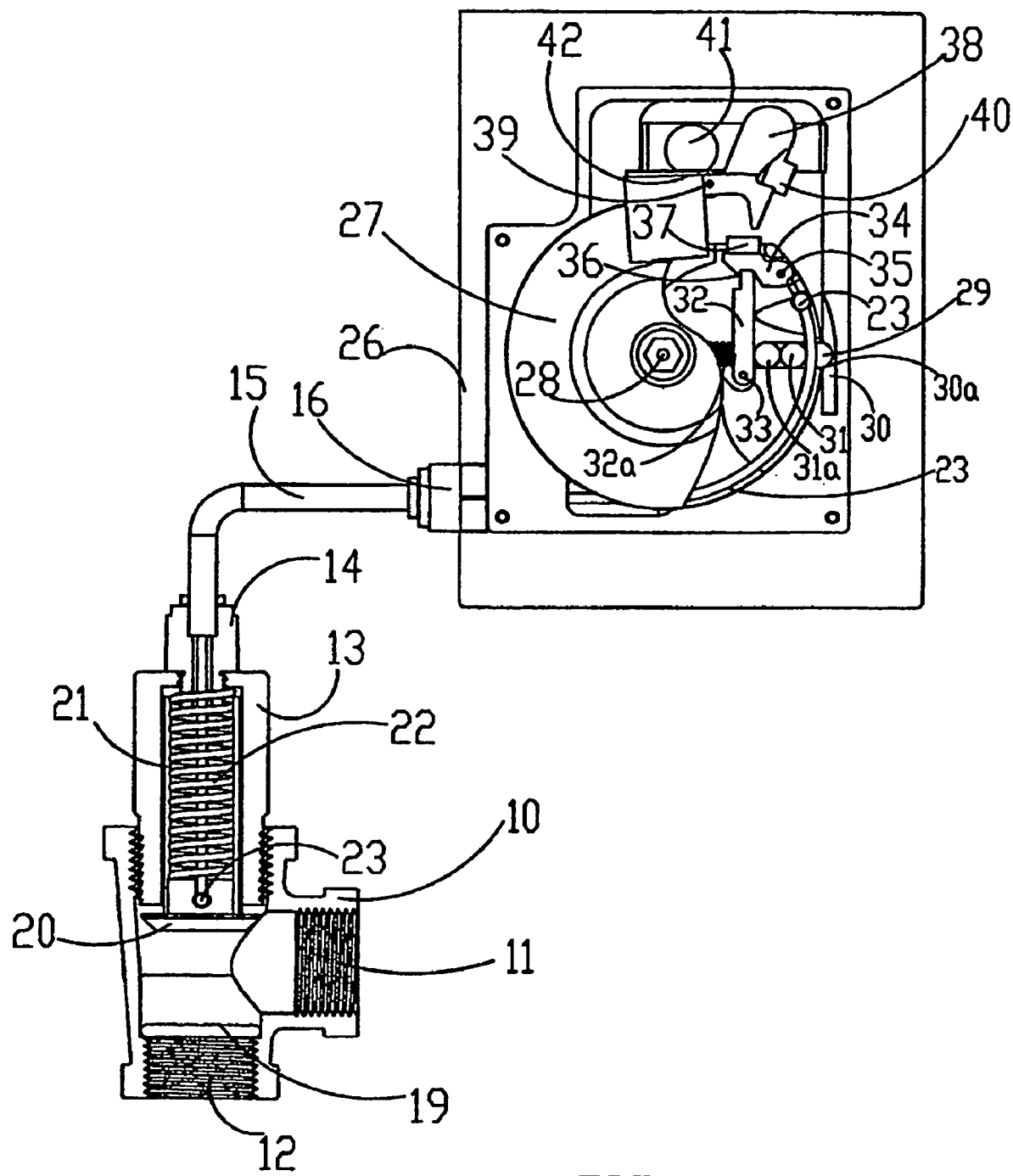
FIG. 3 is a view similar to FIGS. 1 and 2 showing the inside of the valve and the valve actuator in an un-triggered valve ON position.

The valve member 20 is restrained from closing the valve by a cable 23 that is connected with the mechanical actuator 17. The cable 23, as can be seen from FIG. 3, is connected to the valve member, extends through the housing 13, and through a tubing connector 14. Tubing 15 protects the cable between the housing 13 and the actuator 17, and connects with a further tubing connector 16 mounted on the actuator 17.

The mechanical actuator 17 is adapted to be mounted to a point of use structure itself by, for example, directly mounting a base 25 of the actuator 17 to the housing by appropriate known means, such as bolts. This eliminates the need for bracing the valve structure as was required in the prior art. Current mechanical valves on the market require such bracing because their sensing means are located in the valve itself, and are not separate from the valve.

The actuator 17, as can be seen from FIG. 1, provides a status viewer 17a for viewing the status of the valve (either ON or OFF). A status indicator-ON symbol is provided as shown in FIGS. 1 and 2, and a status indicator-OFF symbol 18a is uncovered so as to be illustrated through the status viewer 17a when the valve is actuated.

By locating the shutoff valve in a standard tee fitting in accordance with this first embodiment, both installation and disassembly are made quick and simple. Installation of the valve becomes as easy as installing a standard tee fitting. The standard tee fitting can replace an existing elbow in a gas system, and eliminates the need for additional fittings as with prior art devices. As can be seen from FIG. 3, the valve itself provides no additional flow restriction beyond the presence of the tee itself. With the positive shutoff of the valve, there is no chance of the valve reopening by itself after actuation. The use of the valve with the standard tee fitting also allows for an extremely low internal leakage to be achieved within the valve, well below mandated standards.

Figure 2:
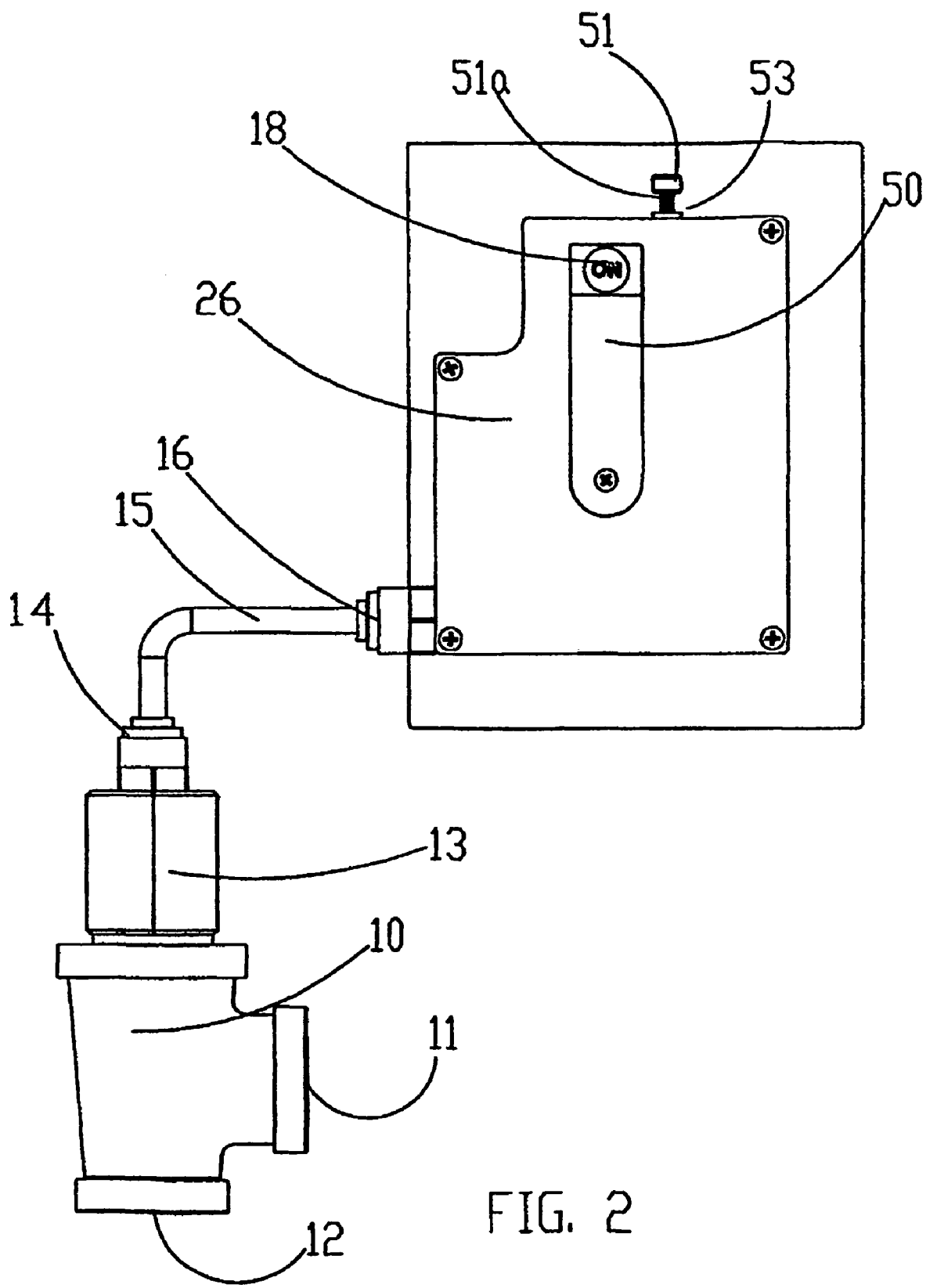
FIG. 2 is a view similar to FIG. 1 with a cover of the valve actuator removed.

Noting FIG. 2, the mechanical actuator includes a trigger housing 26 mounted on the base 25 and housing the components of the mechanical actuator. A trigger housing cover 26a covers these components, while a reset handle including the status indicator-ON is positioned outside of the trigger housing cover 26a.

Turning now to FIG. 3, it can be seen that the cable 23 is connected with a rotor hub 27. The rotor hub 27 serves as a movable member which, upon triggering of the valve, is allowed to move while holding the cable 23. Reference number 28 indicates a handle connection for connecting the reset handle 50, but also points out the central rotational axis of the rotor hub 27.

The cable 23 is connected to the rotor hub 27 by known means. In the position illustrated in FIG. 3, the rotor hub 27 is held in place, retracting the cable 23 and the stopper 20 against the force of spring 22. Thus, in the position of FIG. 3, the rotor hub 27 serving as a cable holder for cable 23 is biased to rotate in the clockwise direction by the force on the cable 23 from the spring 22. It is kept from rotating by a detent so as to hold the flexible cable 23 in the valve open position.

Figure 4:
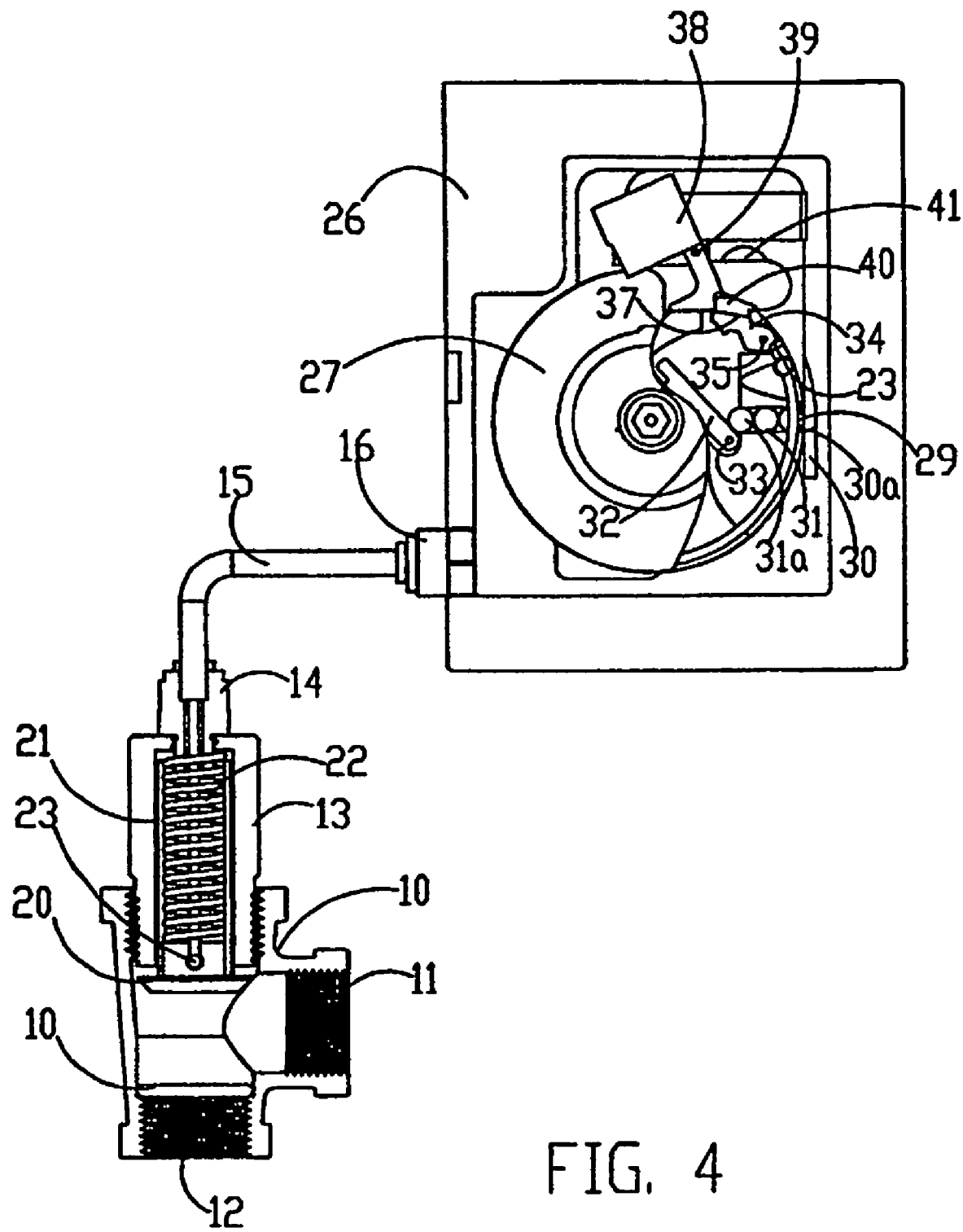
FIG. 4 is a view similar to FIG. 3 illustrating the triggering of the valve actuator.

In this embodiment, the detent comprises a locking ball 29 which engages between an edge of the rotor hub 27 and a locking plate 30 to prevent movement of the rotor hub 27. The locking ball 29 is held in place by the presence of two spacer balls 31 and 31a provided in a suitable channel in the rotor hub 27. The spacer balls are in turn held in place by the presence of lever 32. When the lever 32 releases the spacer balls 31 and 31a as shown in FIG. 4, the locking ball 29 can move to the left as seen in FIG. 4. An angle on locking plate 30 helps to ensure that the locking ball 29 will move toward the left, under the force generated from the rotor hub 27 being pulled by the cable 23. See also the discussion below.

A cable release mechanism is operable to release the rotor hub 27. In this embodiment, the cable release mechanism releases the lever 22 from its position holding the spacer balls 31 and 31a in place to allow movement of the locking ball 29 and thus movement of the rotor hub 27. Thus in this embodiment, the cable release mechanism includes a releasable latch which holds lever 32 in place and is operable to release the lever to allow movement of the rotor hub 27. The releasable latch is designated by reference number 34. As can be seen from FIG. 4, when the latch 34 moves about latch pivot 35 to release lever 32, lever 32 rotates about lever pivot 33 against the force of return spring 32a due to the force applied by the spacer balls 31 and 31*a* through the force on the locking ball 29. The cable release mechanism further includes a sensor and a latch release that is operable to release the latch 34 in response to activation of the sensor. Interaction of the latch and the lever is discussed in further detail below with respect to the latch surface 36. Also note the discussion of the activation of the locking ball 29 with respect to the vertical force and the locking ball and the locking plate angle 30*a* in order to have the locking ball moved to the left.

In this embodiment, the sensor is embodied by a flapper 38 which pivots on a flapper pivot 39 and carries a magnet or target 40. An inertia ball 41 is mounted on a pedestal 42. In the event of a seismic disturbance of a predetermined amount, the inertia ball 41 falls off of the pedestal 42 onto the flapper 38 to pivot the flapper 38 about the flapper pivot 39 into the position illustrated by FIG. 4. In this position, the flapper magnet or target 40 engages with a magnet or target 37 on the latch 34 to release the lever 32. While the flapper arrangement is preferred in this embodiment, various sensor mechanisms and ways of releasing the rotor hub 27 will occur to those of skill in the art. For example, attention is directed to the various shutoff mechanisms illustrated in U.S. Pat. Nos. 6,705,340, 6,085,772, 5,409,031, 5,119,841 and 4,903,720; each of these patents is incorporated herein by reference.

Figure 5:
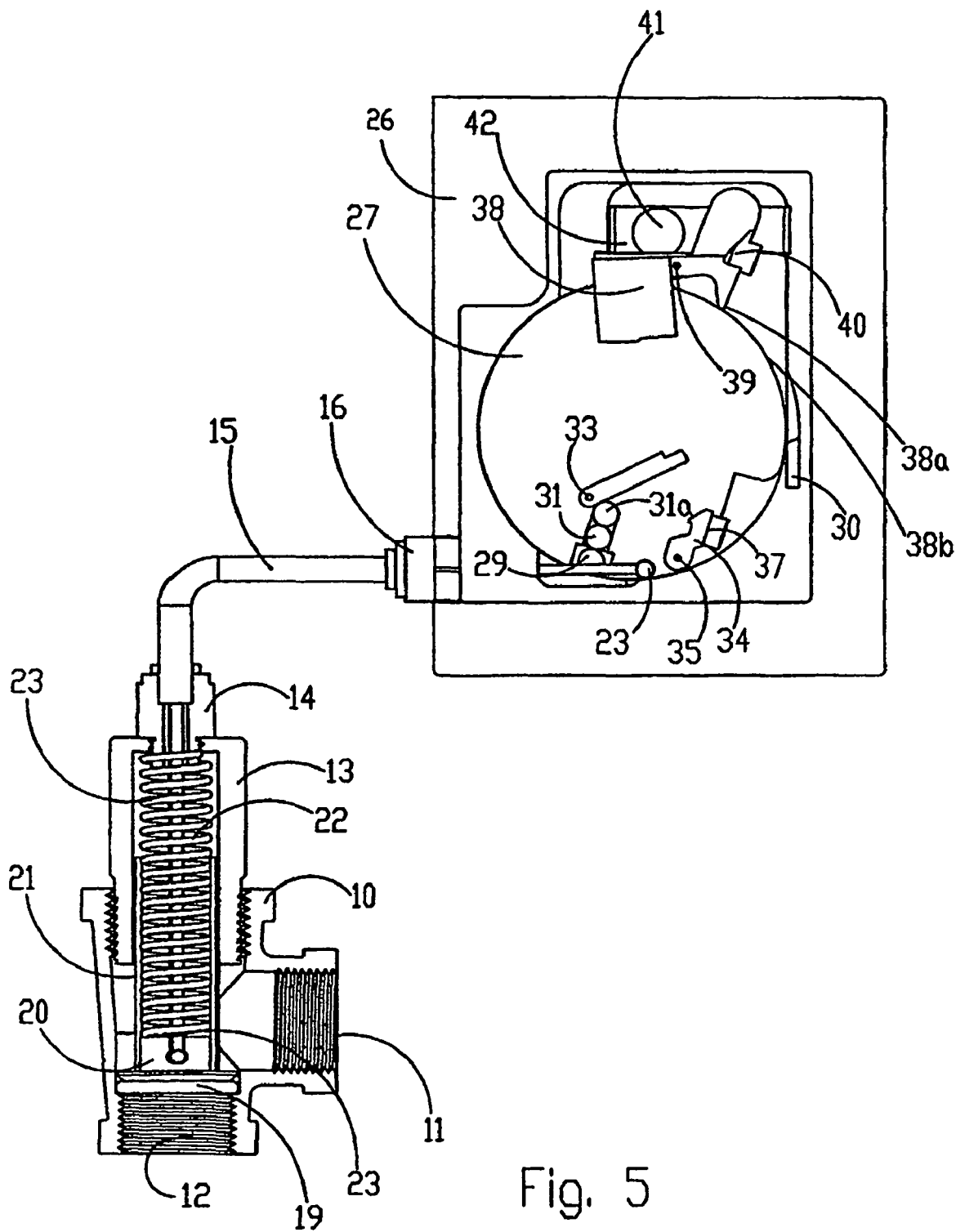
FIG. 5 is a view similar to FIGS. 3 and 4 illustrating the valve and valve actuator in the valve closed position.

Turning now to the comparison between FIGS. 4 and 5, it can be seen that upon, for example, a seismic disturbance, the inertia ball 41 falls off of its pedestal 42 to engage the flapper 38. This causes the latch 34 to be released as shown in FIG. 4. This causes the lever 32 to be movable against its return spring by the force on the locking ball 29, allowing the rotor hub 27 to rotate in the clockwise direction. This allows the cable 23 to be pulled out of the housing 26 through the tubing 25 to allow the valve 20 to close against the seal 19. This is the condition illustrated in FIG. 5. Thus, a closed position of the valve results, shutting off the flow of gas between the inlet 11 and the outlet 12.

During the period of rotation from the point illustrated in FIG. 4 to that illustrated in FIG. 5, a cam surface 27*a* on rotor hub 27 engages with a flapper cam follower 38*a* to push the flapper 38 back to its original position, as shown in FIG. 5. This causes the inertia ball 41 to return to the pedestal 42. This condition is maintained during the closed position of the valve by the engagement of the flapper cam follower 38*a* with the outer surface 38*b* of the rotor hub 27. In other words, further seismic disturbance while the valve is closed will not cause the flapper 38 to return to its actuator position. Rather, it will remain ready for a re-actuation after the valve is reset.

Figure 6:
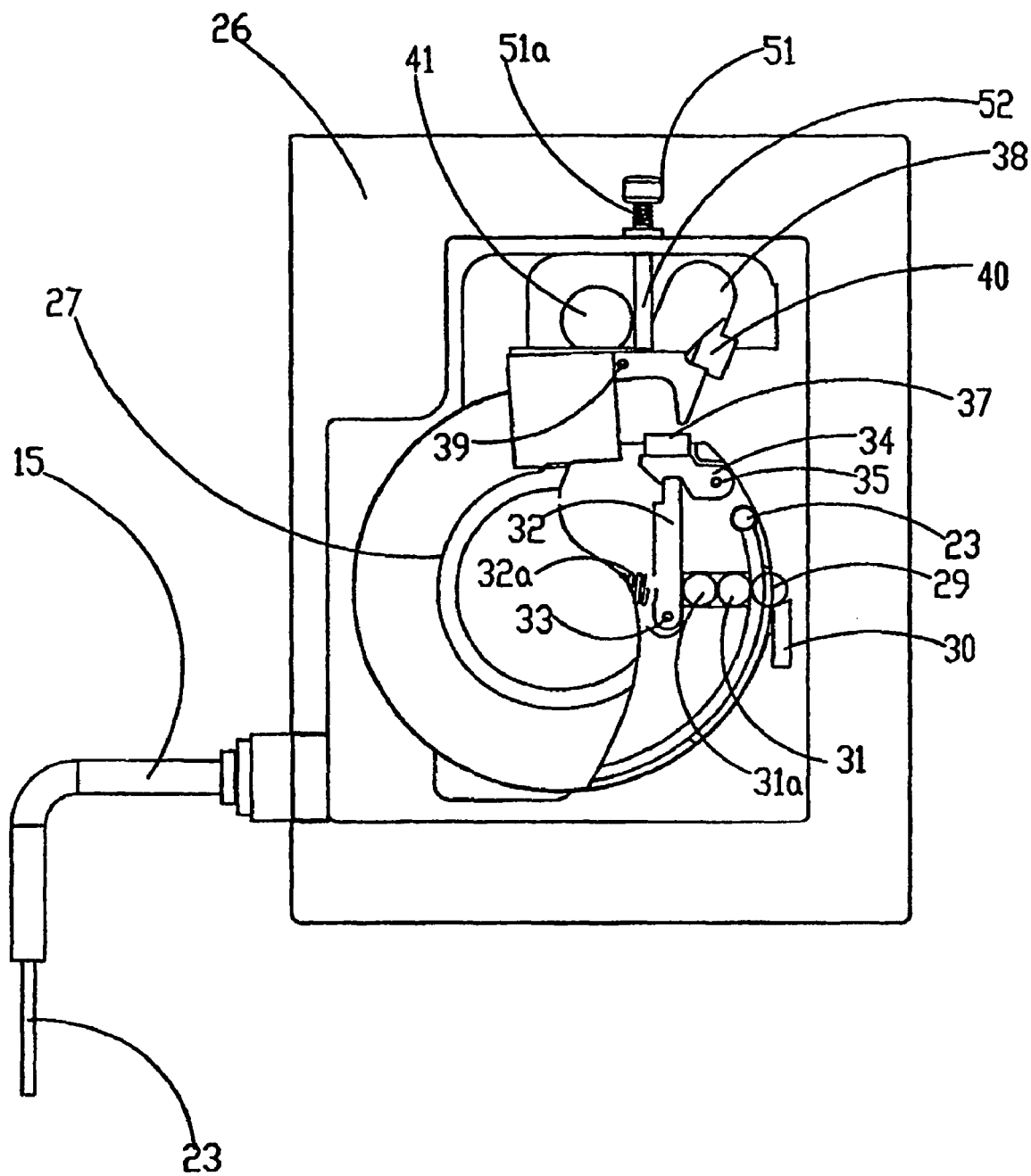
FIG. 6 is a view of the valve actuator in the valve ON un-triggered position.
Figure 7:
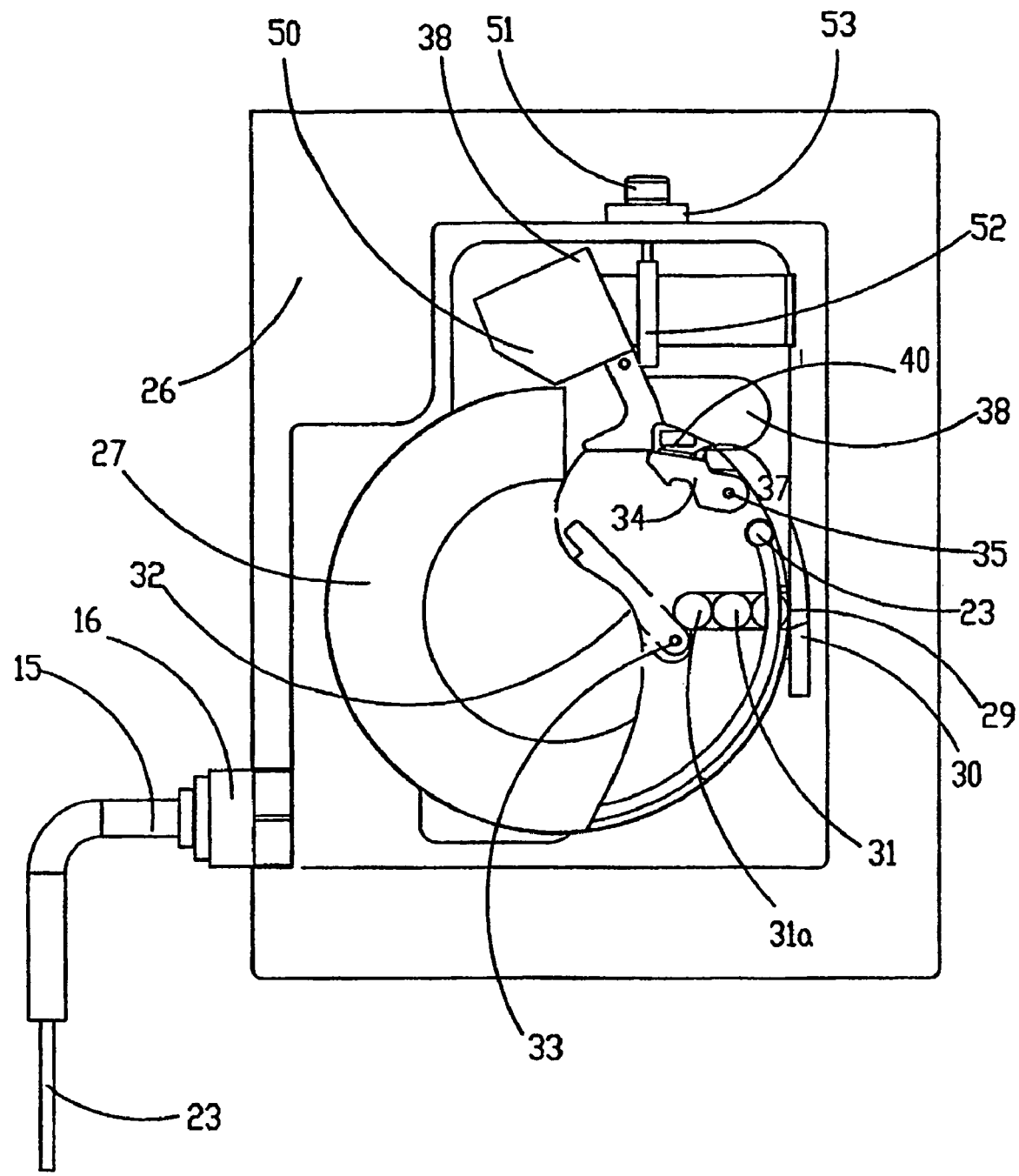
FIG. 7 is a view similar to FIG. 6 showing manual triggering of the valve actuator.
Figure 9:
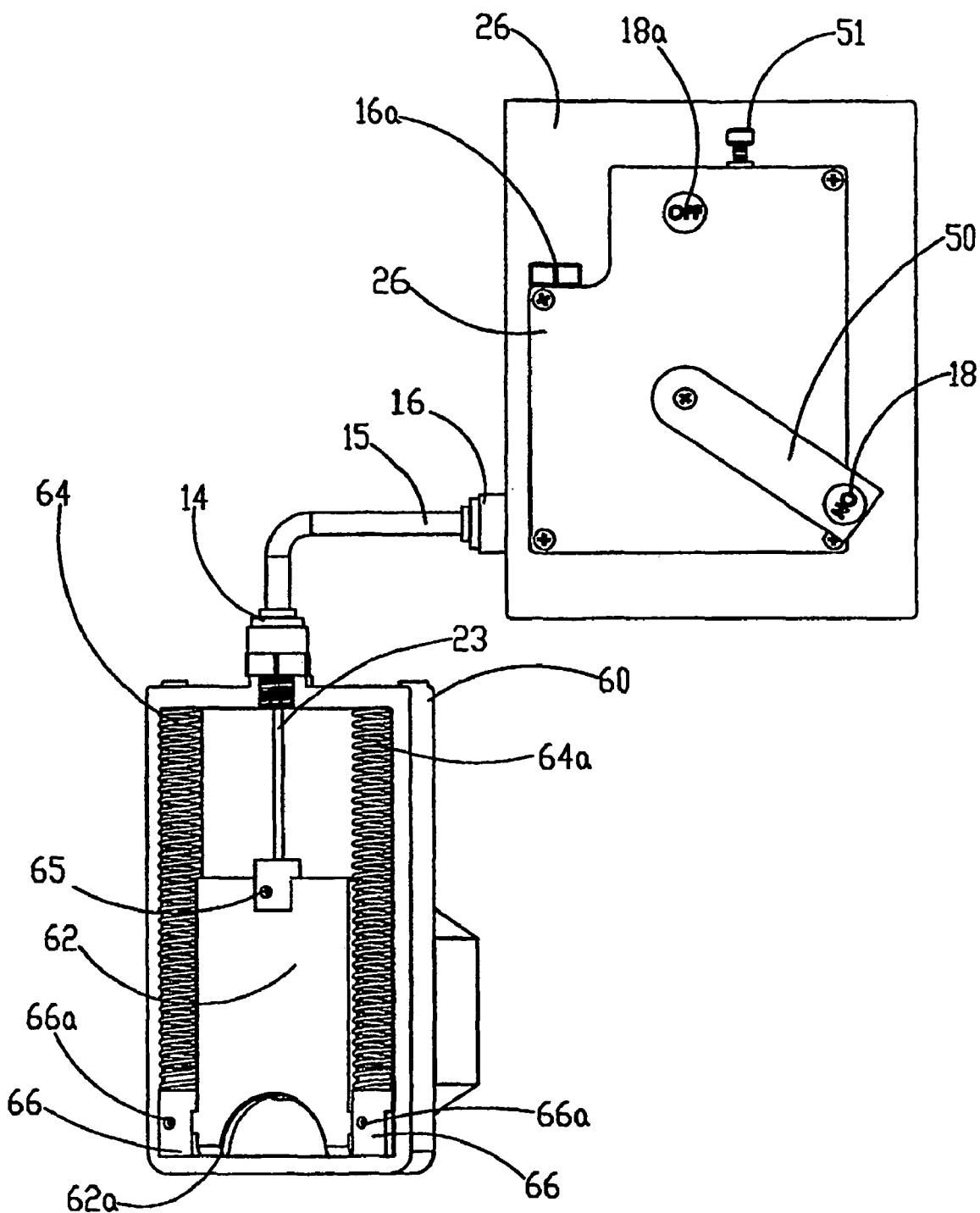
FIG. 9 is a view similar to FIG. 2 illustrating the gate valve in the OFF position.

When the valve is actuated, as noted above, the reset handle 50 rotates with the rotor hub 27 to uncover the OFF indicator 18*a* as illustrated in FIG. 9, for example. The actuator 17 is reset by using the handle 50 after opening an outer cover on the actuator. The rotor hub 27 is simply rotated back in place by the handle 50 until the return spring 32*a* causes the lever 32 to push the spacer balls 31 and 31*a* against the locking ball 29 and into the position where it operates as a detent as shown in FIG. 6.

A manual off button 51 is provided on top of the trigger housing 26 for purposes of manually activating the closure of the valve. A return spring 51*a* biases the manual off button into the position illustrated in FIG. 6. The manual off button 51 is pushed against the bias of the return spring 51*a* to push down the flapper 38 to engage with the latch 34, for example by magnetic attraction between magnet or target 37 and magnet or target 40. A solenoid coil 53 is provided around a manual off pin 52 so that the manual off feature could in fact be remotely activated by activation of the solenoid coil 53. The button 51 is thus made of a material that can be attracted by magnetic force of the coil to move the push pin 52 to tip over the flapper 38. Such a solenoid coil could be remotely activated by interconnecting it with any number of features, including carbon monoxide gas sensors, home security systems, etc. Thus the valve system can be adapted to not only provide seismic shutoff, manual shutoff, but also shutoff in response to any number of emergency situations that might be involved at the point of use.

FIGS. 8-11 refer to a gate valve alternative to the tee valve illustrated in the first embodiment. While the valve, and its installation, is different, the mechanical actuator 17 is substantially the same, as can be seen for example from the illustration of FIG. 8.

Figure 8:
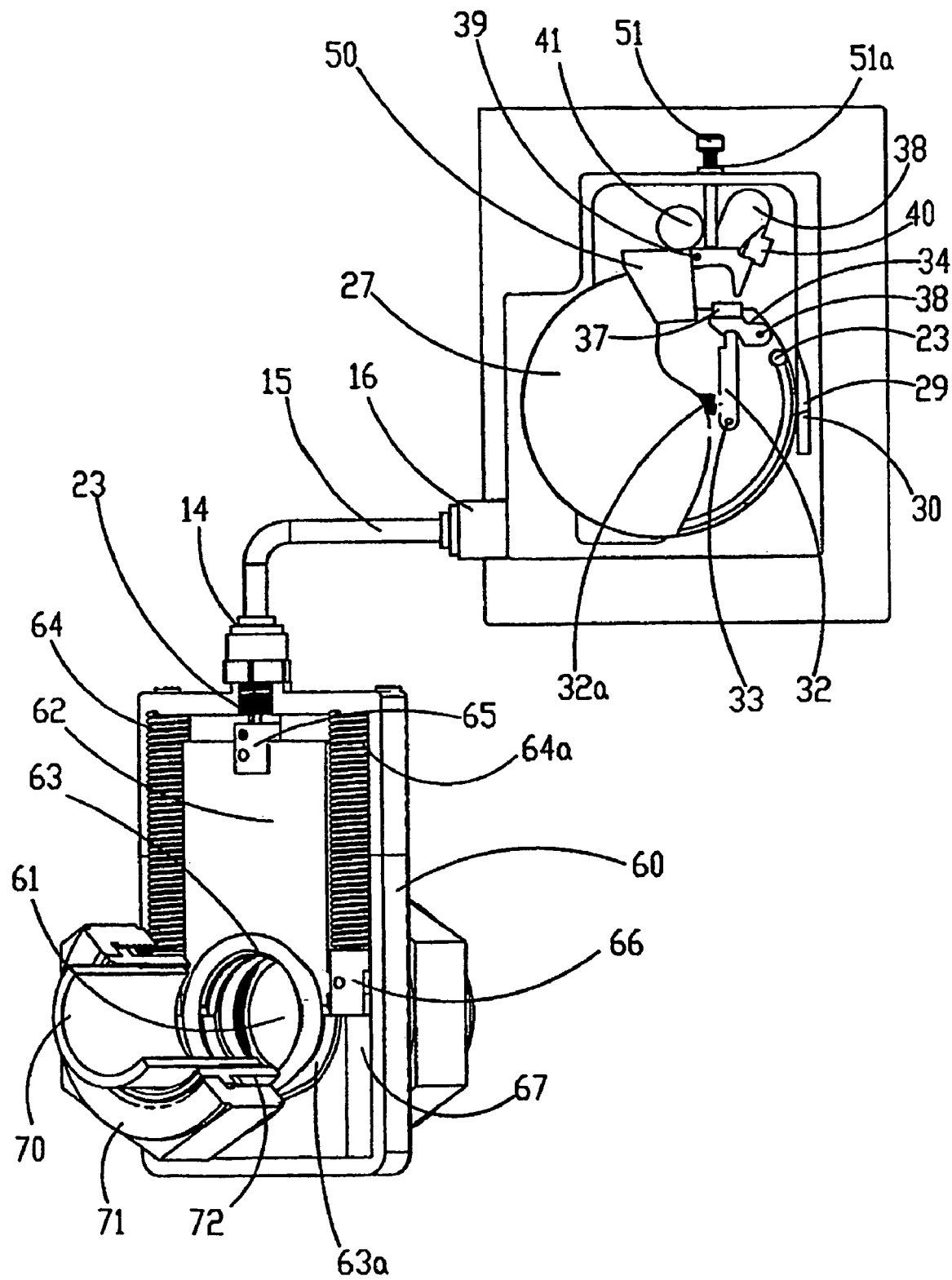
FIG. 8 is a view similar to FIG. 3 but illustrating a gate valve alternative.

In this embodiment, a gate valve housing 60 has a fluid passageway 61 therethrough for the flow of gas between pipes 70. A gate 62 is biased by first and second gate springs 64 and 64*a* toward a closed position. FIG. 8 illustrates an open position in which the gate is held in the open position by cable 23 and actuator 17 in the same manner as discussed above. The cable 23 is connected to the gate 62 by a suitable cable gate connector 65. The springs 64 and 64*a* are connected to the gate by spring gate connector 66 and connector pin 66*a*. In this embodiment, similar to the first embodiment, triggering of the actuator 17 causes the cable 23 to be allowed to move under the bias of the springs 64 and 64*a* so as to push the gate 62 into a closed position in which it cuts off the fluid passageway. This position is illustrated in FIG. 9. It should be pointed out that the gate 62 is supported and allowed to float between two seals 63. Also note FIG. 10. Seal retainers 63*b* include grooves 63*a* holding their respective seals 63. The housing provides a stop for the movement of the gate 62 in the closed position of the valve. The spring cylinder 67 in the gate valve housing 60 is formed for the expansion of the springs 64 and 64*a*, furthermore. As can be seen from FIG. 9, an end 62*a* of the gate 62 is forced into abutment with the housing 60 by the springs in the closed position through the action of the spring gate connector 66 with the gate 62.

Figure 10:
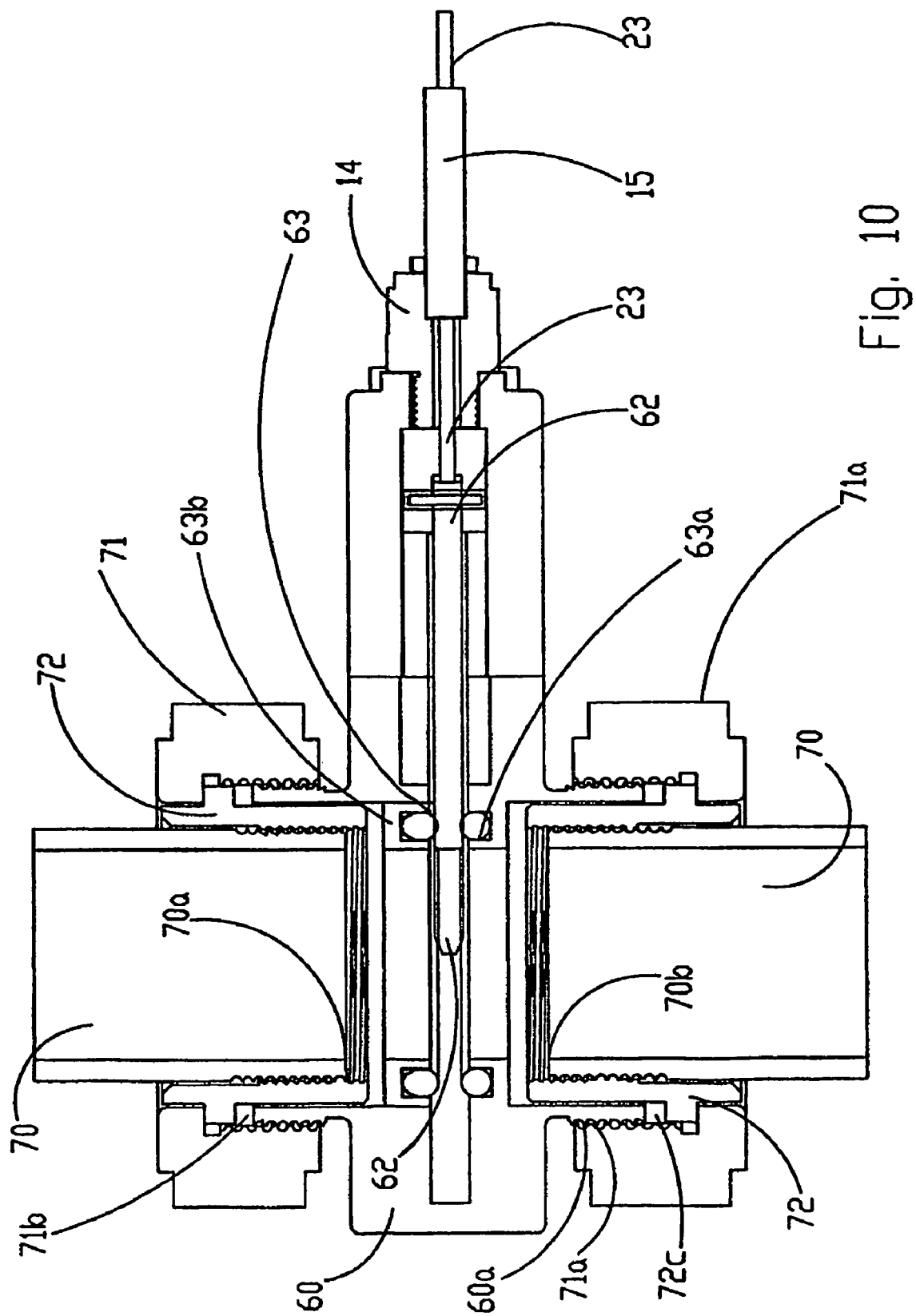
FIG. 10 is a cross-sectional view of the gate valve and its connection to adjacent pipes.
Figure 11:
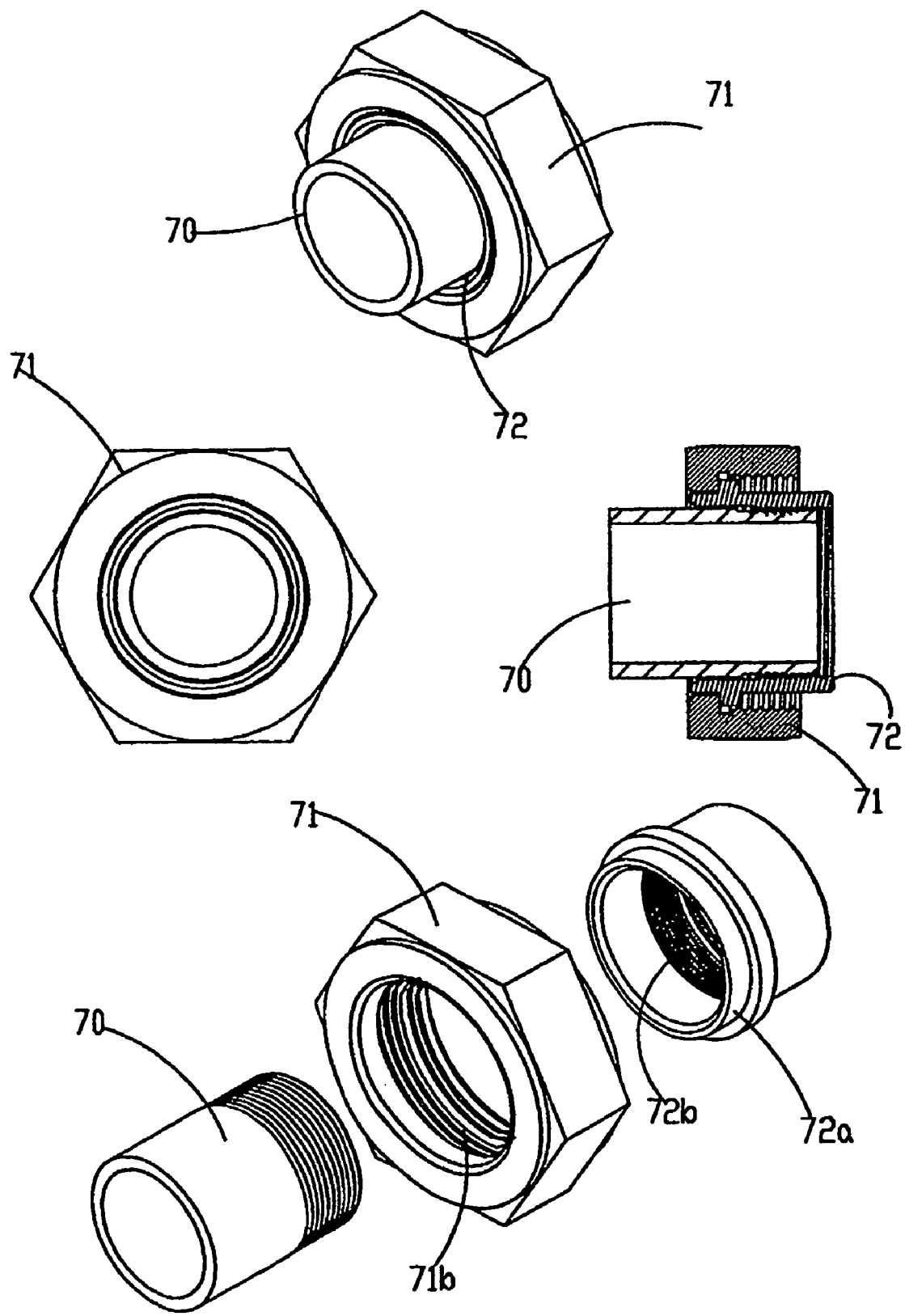
FIG. 11 includes an exploded perspective view of a connector arrangement for connecting a gate valve housing to the end of a pipe, a cross-sectional view of the assembled connector arrangement, an end view of the assembled connector arrangement, and a perspective view of the assembled connector arrangement.

As can be best appreciated from FIGS. 10 and 11, an advantageous aspect of the present invention is a connector arrangement which permits the gate to take up only a small amount of space in the installation, and allows it to be installed on the ends of pipes with relative ease. The gate valve, furthermore, could be used with gas or water as the fluid medium to be stopped.

The connector arrangement includes union nuts 71 and inserts 72 for connection and engagement with the gate valve housing 60 and the ends of pipes 70. In the drawing figures, reference numbers 70*a* and 70*b* represent the pipe ends. The inserts 72 are threaded to the respective pipe ends at a gate housing side of the insert; i.e. the threads on the inserts are formed at the side thereof closest to the gate housing. They further include flanges as engagement portions for engaging with the union nuts 71 and 71*a* at a pipe side of the insert, i.e. at the side of the insert remote from the gate housing 60. The union nuts 71 and 71*a* then engage these respective flanges of the insert 72 and are threaded to corresponding gate housing union nut threads 60*a* on the gate valve housing 60. These threads on the union nuts are at the gate housing side thereof, while their flange engages the insert flange on the insert on the pipe side of the union nut. This arrangement, as can best be seen from FIG. 10, ensures that the amount of space necessary to mount the gate valve between the pipes ends 70*a* and 70*b* is minimized. In the drawings, note that reference numbers 71*b* and 72*c* represent upper and lower union nut seals for sealing between the insert, union nut and the gate housing, as illustrated. In other words, the pipes are threaded into the inserts so that the pipe ends are inside of the union nut, as opposed to being outside, as in normal union fittings. The ends of the pipes are thus closer together than with standard union fittings.

In the second embodiment of the valve, it should be noted that the gate is only halfway supported. That is, as can be seen from FIG. 9, the end of the gate forms a semicircle which serves to circumscribe half of the passageway. A complete hole in the plate is not provided. This allows the size of the valve to be reduced, because when the gate is fully closed, the end of the gate sticks out less than if the gate circumscribe the entirety of the passageway in the open position. This also reduces the corresponding amount of friction during movement of the gate.

FIG. 9 also illustrates an optional plug 16a. This simply allows the cable 23 to extend through a different location. This may be desirable with an arrangement in which a longer amount of displacement is desired, for example with larger valves. Plus it will be appreciated that the mechanical actuator can be used with valves of different sizes for different situations, thus expanding the flexibility of the actuator itself.

Figure 12:
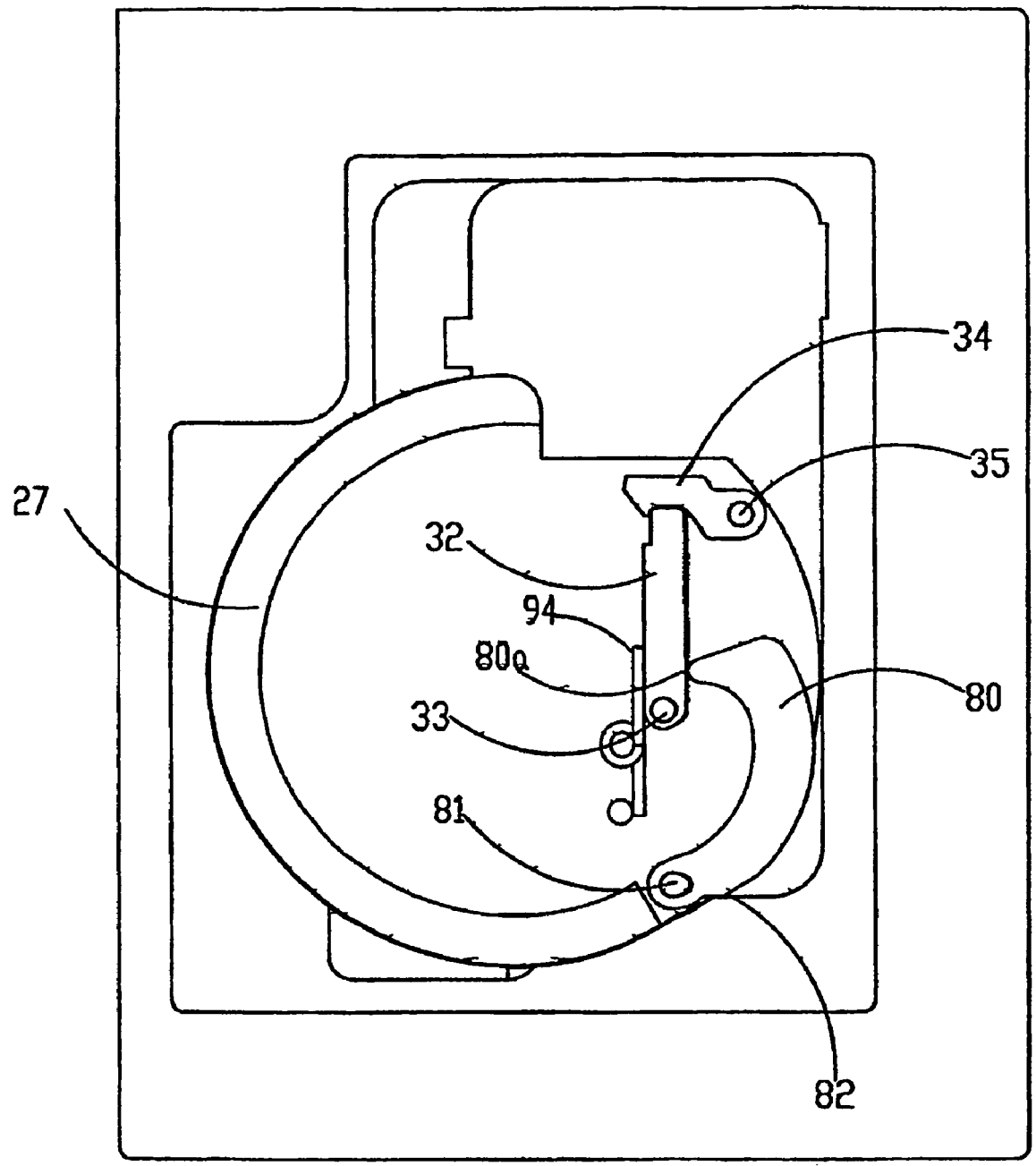
FIG. 12 illustrates an alternative for a release mechanism of the first embodiment in a valve open position.
Figure 13:
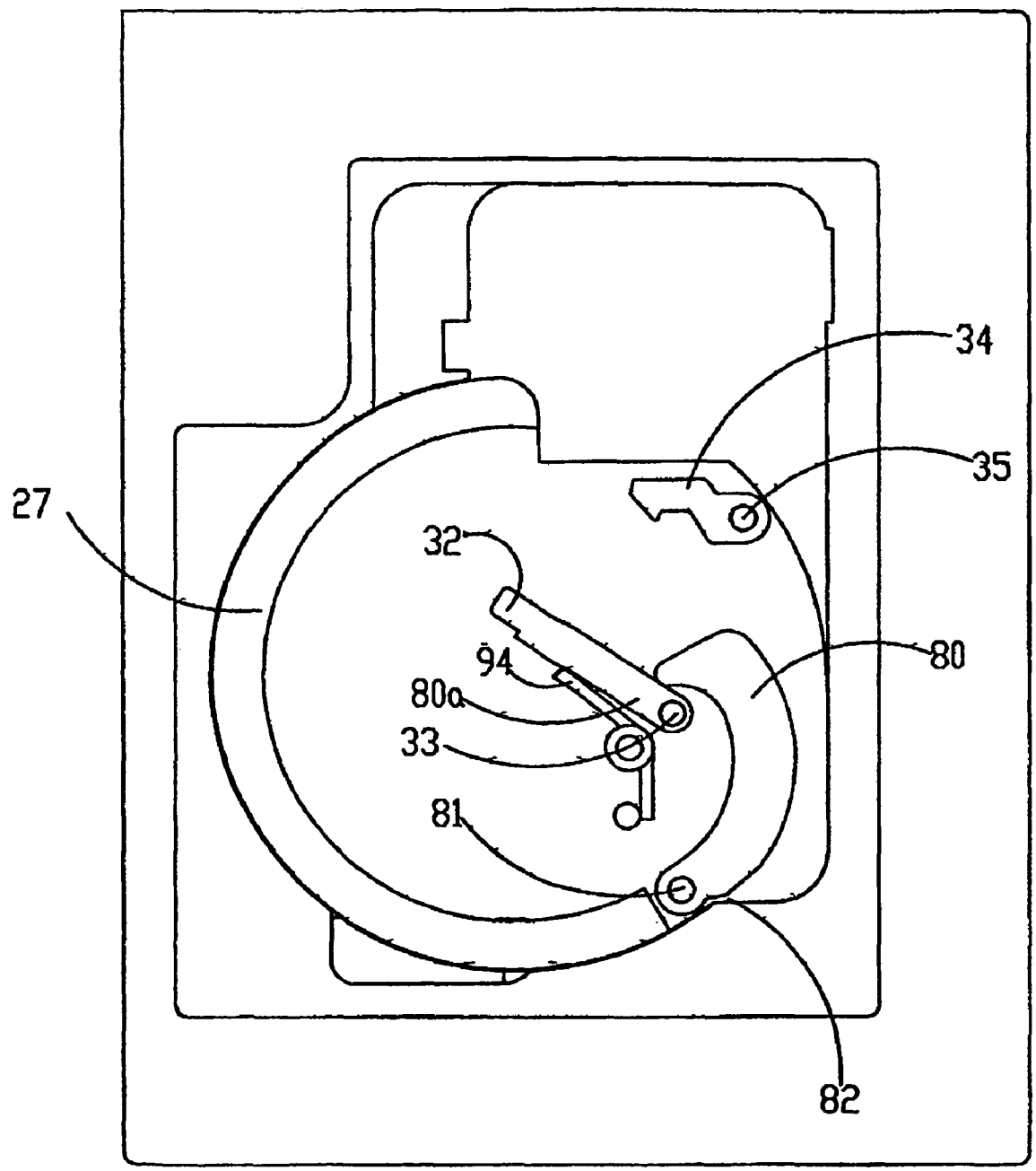
FIG. 13 illustrates the release mechanism of FIG. 12 in a triggered position.

Turning now to FIGS. 12 and 13, a second alternative with respect to the actuator 17 is illustrated. As can be readily seen from the drawing figure, while the rotor hub 27, latch 34 and lever 32 remain essentially the same as with respect to the first embodiment, the detent is formed in a different manner. The rotor hub 27 is maintained in position by the action of a detent member engaging a portion on the housing, i.e. locking surface 82. This detent member comprises a locking lever 80 which forms a detent for engagement with the locking surface on a lower end thereof near locking lever pivot 81. Reference number 80a represents a lever contact point, at which point movement of the locking lever 80 is restrained by lever 32, similar to the manner in which the lever 32 restrains movement of the spacer balls in the first embodiment. The detent engagement point, i.e. locking surface 82, as can be seen from the figures, is very close to the pivot point 81, and a significant mechanical advantage is provided. That is, a reduced amount of force is necessary to hold the locking lever 80 in place, holding the rotor hub 27 in place, because of the mechanical advantage. This is similar to the case with respect to the position of the contact point 80a with lever 32.

Similar to the first embodiment, when the latch 34 is released, lever 32 is allowed to move against its return spring (not illustrated in these figures) to allow the force at locking surface 82 to push on locking lever 80 to allow the rotor hub 27 to rotate, allowing the valve to open.

Figure 14:
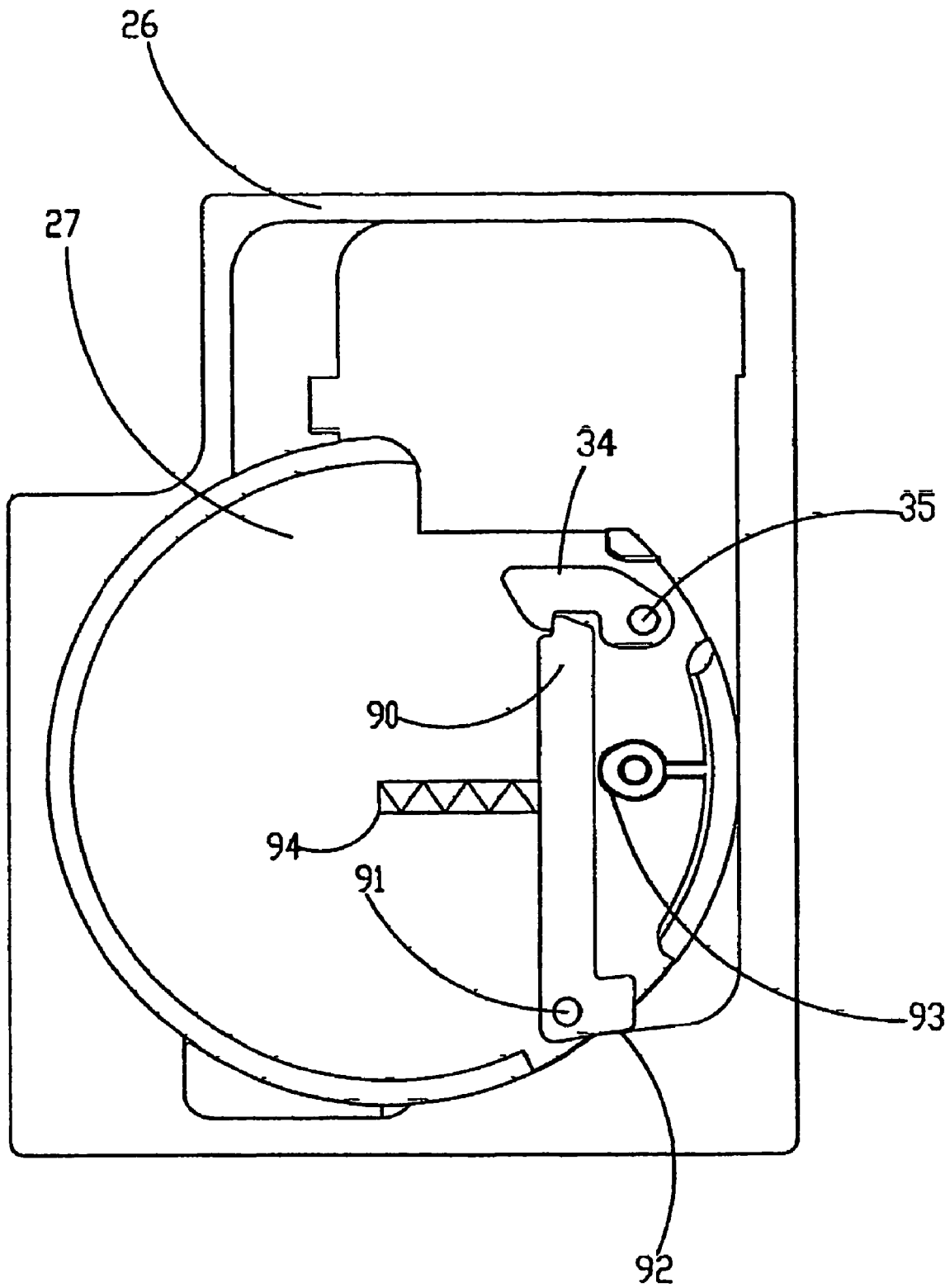
FIG. 14 illustrates another alternative to the release mechanism of the first embodiment.
Figure 15:
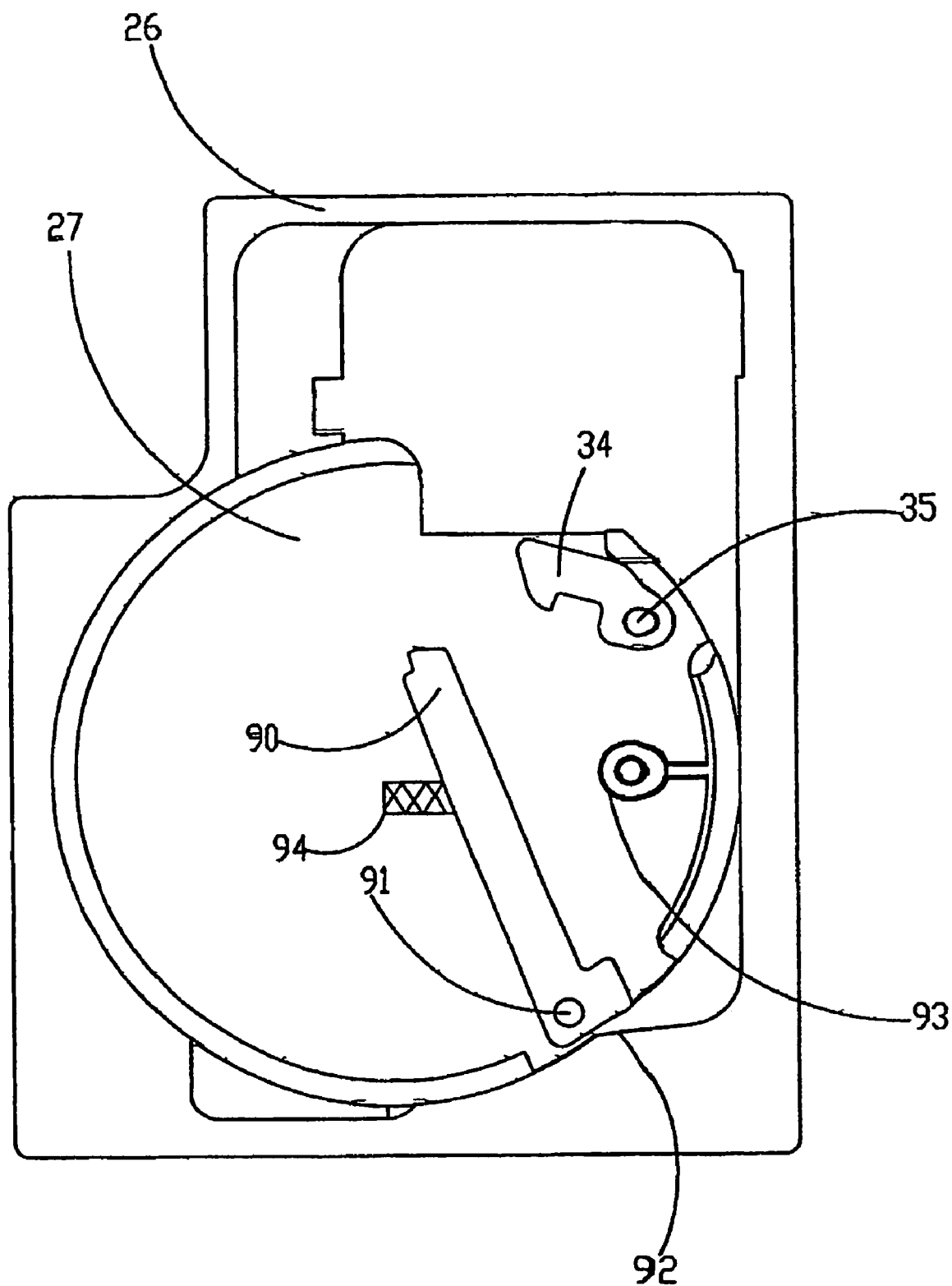
FIG. 15 illustrates the release mechanism of FIG. 14 in the triggered position.

A second alternative is illustrated in FIGS. 14 and 15 with respect to the actuator 17. Similar to the first alternative, in this arrangement the spacer balls are replaced with a lever as a detent. However, in this alternative, the lever 32 is entirely removed and substituted by a single locking lever 90 that is held in place by the latch 34. Locking lever detent or locking point 92 is formed adjacent locking lever pivot 91 to engage with the housing. This embodiment obviously reduces the number of moving parts necessary. Further, spring 94, as the return spring, can be provided with a spring return force which helps reduce the force on the latch 34 as well as acting as the return spring. Reference number 93 refers to a lever stop to prevent over rotation of the lever 90.

In comparing the above two alternatives with respect to the actuator 17, it should be noted that using two levers instead of one as with the first alternative can provide a greater mechanical advantage, due to combining the leverage of both levers.

With respect to the first embodiment, which employs the locking ball 29, appropriate design for the proper operation of the embodiment can be determined in the following way.

Figure 16:
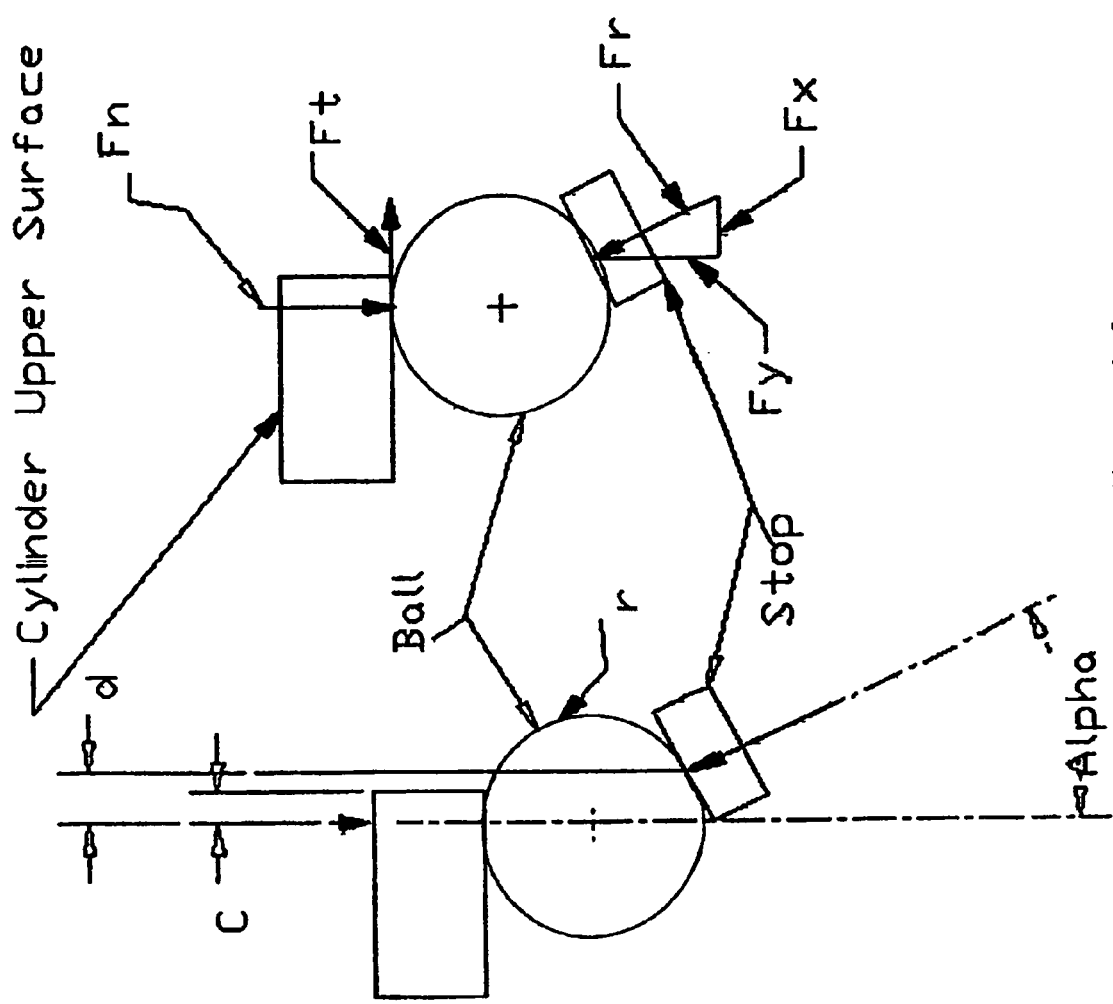
FIG. 16 is a schematic view of a ball detent member for purposes of force analysis.

Given vertical force on the ball, Fn, due to spring load from valve that is transmitted by a cable, find the lateral force on the ball, Fx. Refer to FIG. 16, a schematic of ball, stop and cylinder.

Fn is the input force from the spring, pulling on the cable with pulls the cylinder onto the ball. The vertical motion of the ball is resisted by the stop with is inclined at angle $\alpha$. The angled stop provides a lateral force, Fx to the ball, but motion in this direction is resisted by friction of the ball against the cylinder, and is proportional to the coefficient of friction, $\mu_1$. $\Sigma F$ in x direction and y direction=0 at incipient motion, that is $dx/dt=0$ & $d^2x/dt^2=0$, implies that:

1. Fx>Ft if the ball is to move to the left. And
2. Fn=fy
3. but Ft=$\mu_1$ Fn
4. Fx=sin $\alpha$ Fr
5. Fr=Fy/cos $\alpha$ Combining Eqs. 3 and 4 into 1, we get Eq. 6; sin $\alpha$ Fr>$\mu_1$ Fn. Combining Eqs. 2 and 5 into eq. 6, we get Equ. 7; $\mu_1$<tan $\alpha$. This is the condition necessary if the ball is to move. The coefficient of friction for steel on steel is typically between 0.25 and 0.35, depending on many factors, including contact stress, finish, lubricating materials, humidity and length of time the materials have been in contact. In order to be sure that the ball will move when the latch is raised, the tangent of the contact angle needs to have some reasonable margin above the highest expected coefficient of friction. Below is a table of angles and their tangents.

| Angle, degrees | Tangent |
|---|---|
| 10 | .176 |
| 15 | .268 |
| 20 | .364 |
| 25 | .466 |
| 30 | .577 |

If assume an angle of 25° to be used to assure motion of the ball. Instead of an analysis of inequality to find the minimum angle to produce motion, the same equations can be used to find the actual force transmitted by the ball.

$$Fx=Fn(\tan \alpha - \mu) \qquad \text{Equ. 8}$$

Figure 17:
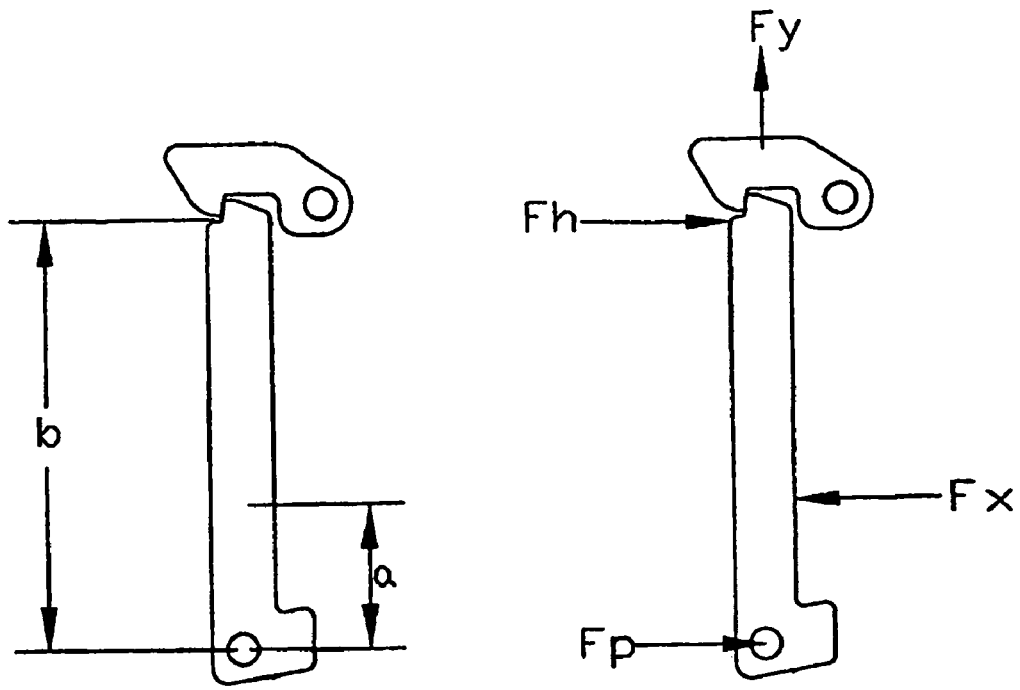
FIG. 17 is a schematic view of a latch and lever for purposes of force analysis.

With respect to the first alternative, please note the following analysis with reference to FIG. 17, a schematic of the alternative.

The lateral force, Fx, exerted by the ball that was calculated in the above analysis, tends to rotate the vertical lever CCW. The force exerted by the lever onto the latch at distance b above the pivot can be found by setting the sum of the moments about the pivot to zero.

$$b\ Fh=a\ Fx \qquad \text{Equ. 9}$$

If the coefficient of friction between the lever and the latch is $\mu_2$, then the vertical force to raise the latch is:

$$Fy=\mu_2\ Fh \qquad \text{Equ. 10 Which leads to}$$

$$Fy/Fn=\mu_2 a/b(\tan \alpha - \mu_1) \qquad \text{Equ. 11}$$

If a=0.20, B=1.00, $\mu_2$=0.30, $\mu_1$=0.20 and $\alpha$=25°, then $$R=Fy/Fn=0.16=1.6\%$$

If Fn=20#, then Fy=32#

A possible cost reduction change in this option is to use a smaller, say φ0.094, ball or dowel pin to provide the stop, instead of the hard steel plate. The ball or dowel pin would be inserted into a pocket molded into the housing.

Figure 18:
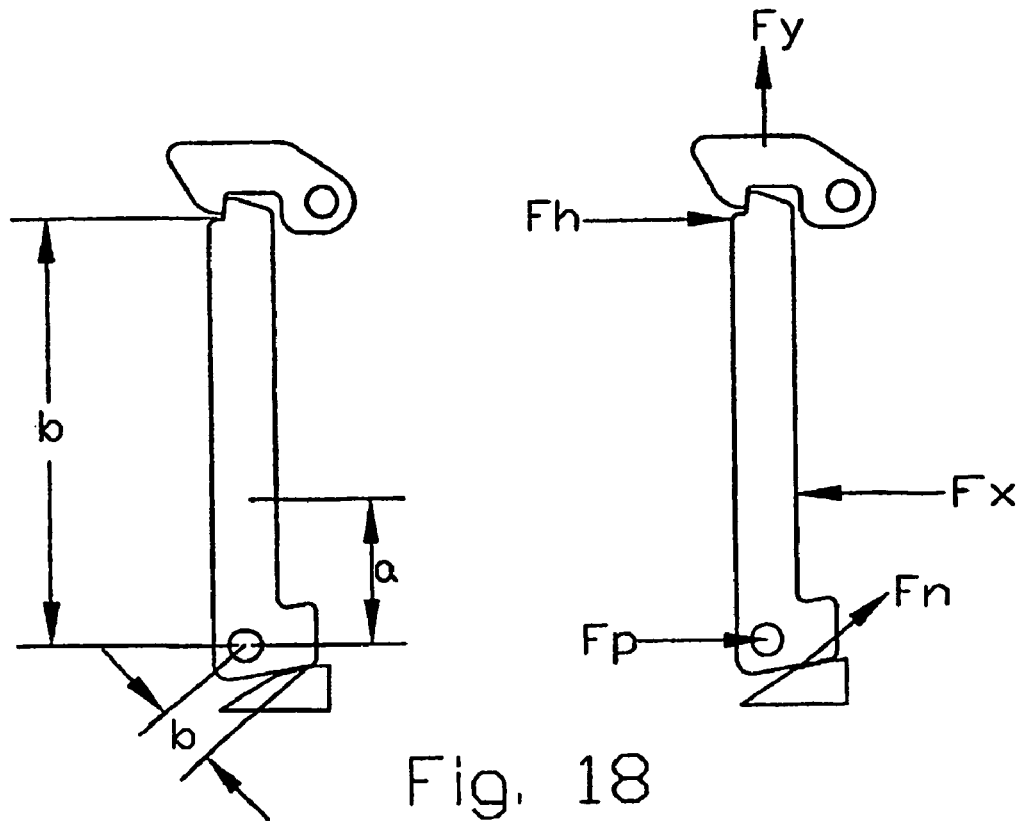
FIG. 18 is a schematic view of a latch, lever, detent and stop for purposes of force analysis.

An analysis of the second alternative follows with reference to FIG. 18, a schematic of this alternative.

This is a simpler design with just three parts to the schematic. The vertical lever is attached to the rotating hub. An extension off of the lever is restrained by a ledge on the main housing. The hub is rotated by the force applied by the valve spring, as in Option 1, however, now the force, Fn, is applied to the lever extension at distance b from the lever pivot.

$$Fy = \mu_2 Fh \quad \text{Equ. 12}$$

$$Fh = b/a\, Fn \quad \text{Equ. 13}$$

So that:

$$Fy/Fn = \mu_2\, b/a \quad \text{Equ. 14}$$

If b=0.173; a=1.899, $\mu_2$=0.30, then $$R = Fy/Fn = 0.27 = 2.7\%$$

Figure 19:
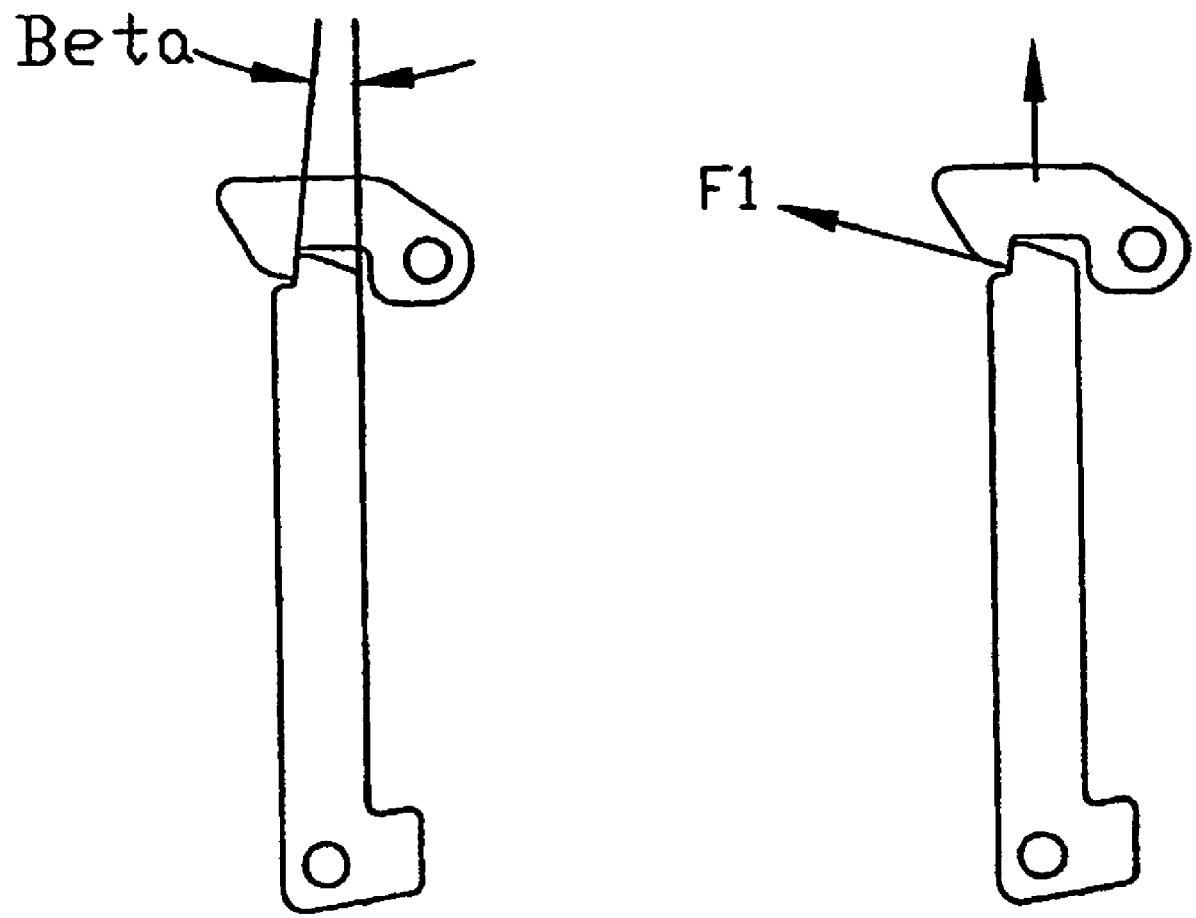
FIG. 19 is similar to FIG. 18 and illustrates an angular modification to the latch.
Figure 20:
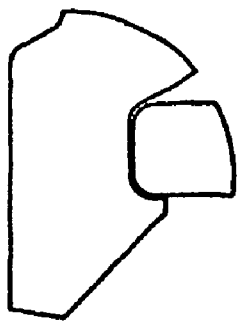
FIG. 20 is a schematic view of a portion of the latch and lever according to the first embodiment.
Figure 21:
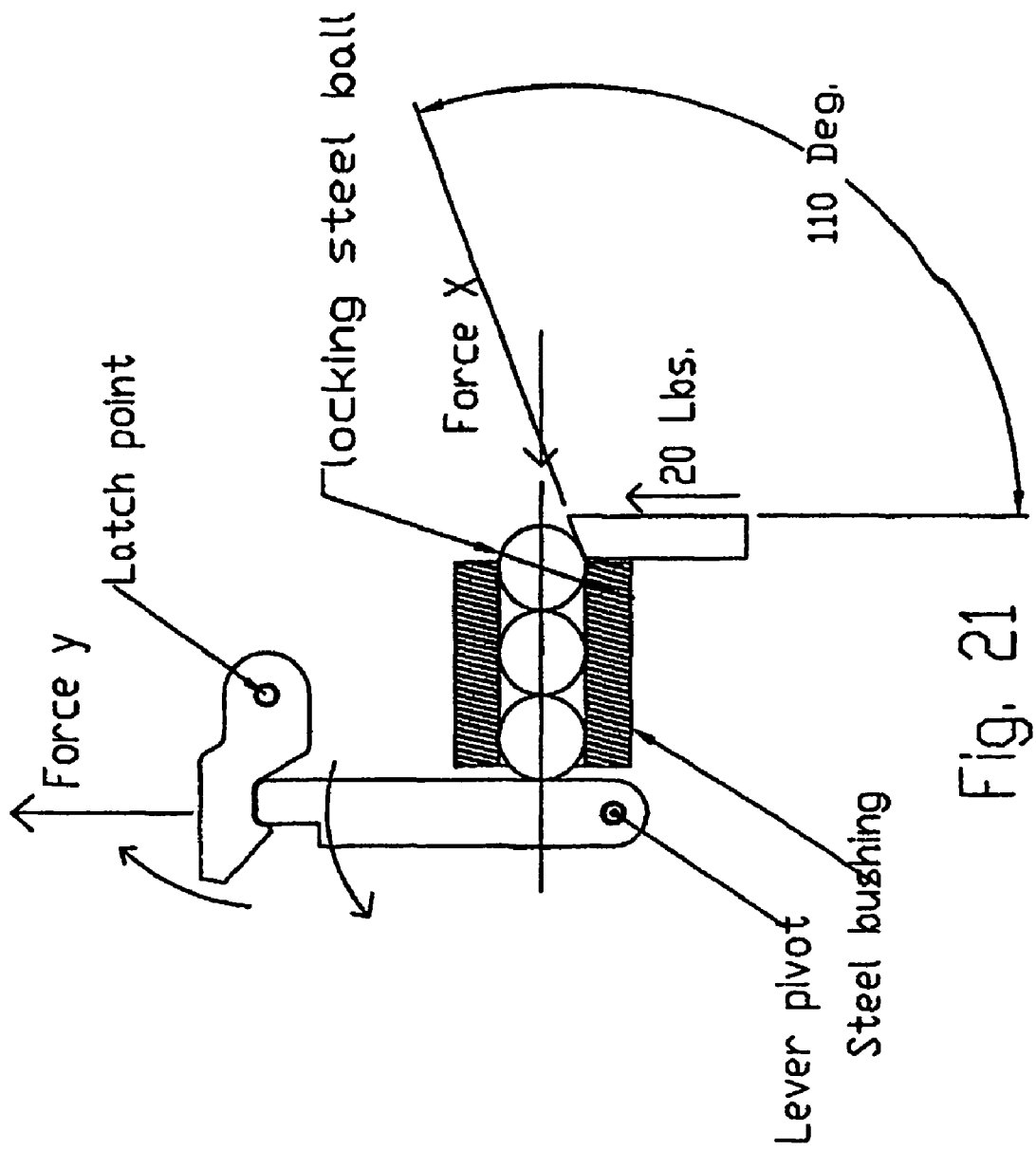
FIG. 21 is a schematic view illustrating the forces on a release mechanism according to the first embodiment.
Figure 22:
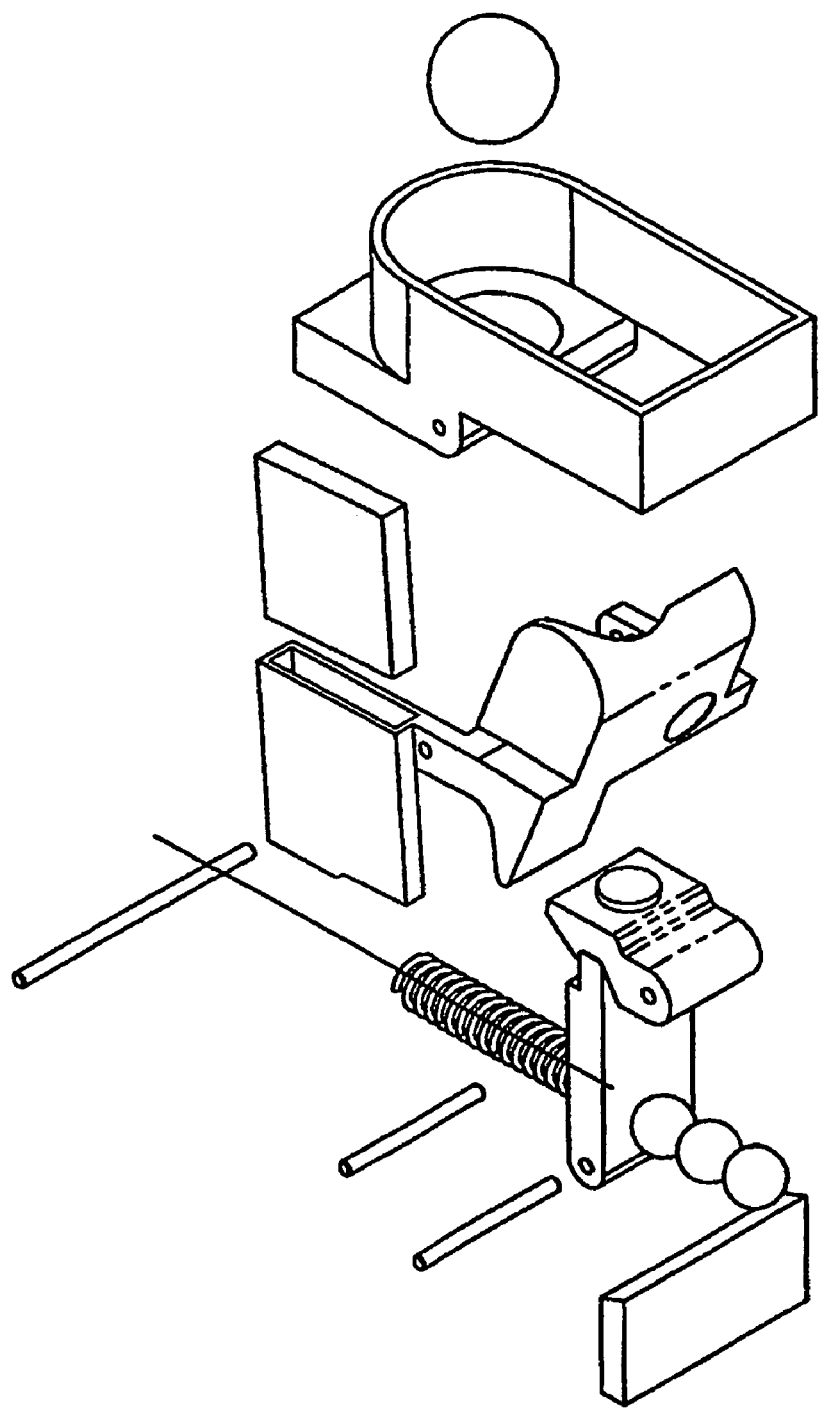
FIG. 22 is an exploded perspective view of a sensor and release mechanism according to the first embodiment.

Both designs could benefit from the addition of a slight angle to the lip of the latch. This is discussed with respect to FIG. 19, demonstrating an angular modification to the lip of the latch. All other forces and dimensions remain the same as with respect to FIG. 18.

Using the same kind of analysis, the force ratio for the is geometry is:

$$R = Fy/Fn = b/a(\mu_2 - \tan\beta) \quad \text{Equ. 15}$$

When β=10°, and all the other parameters are the same as before, R=0.0113=1.13% so Fy=0.225# when Fn=20#.

Figure 23:
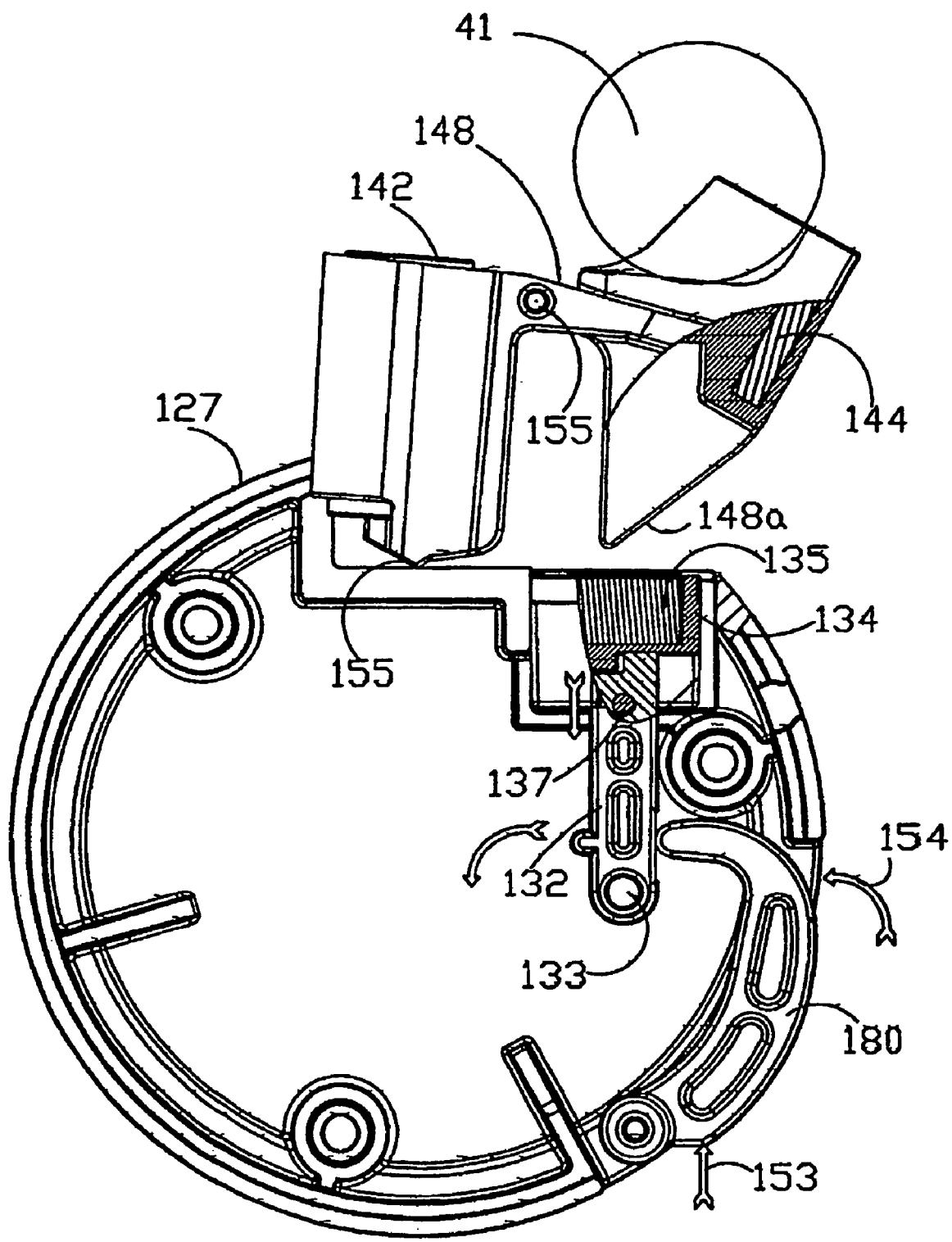
FIG. 23 is a side view, partly in cross-section, of a release mechanism similar to the alternative of FIG. 12.

FIGS. 23-29 illustrate a preferred embodiment of a variation of the release mechanism of FIG. 12. In FIG. 23, a rotor hub 127 is illustrated with a front cover part thereof removed, and with certain parts shown in cross-section. Similar to the embodiment of FIG. 12, a locking lever 180 is used to hold the rotor hub 127 in a lock position against the force on a cable held by the rotor hub 127 in a manner similar to the previously-described embodiments. It is noted that parts not specifically described with respect to this embodiment are the same as with the previous embodiments, and the release mechanism according to this embodiment is employed in the same way as, for example, with respect to the embodiment of FIG. 12. Thus, a cable connected to the rotor hub 127 may be spring biased by, for example, a valve member toward a closed position of the valve, with the locking lever 180 engaging a housing (not shown) to hold the rotor hub 127 in the position illustrated in FIG. 25, similar to the operation of the embodiment of FIG. 12.

Thus, when in a valve-open position, for example, or a lock position of the release mechanism of this embodiment, a locked force is applied at 153 as shown by the arrow, by engagement with the rotor hub housing. A lever 132, similar to the lever 32 of the embodiment of FIG. 12, engages an end of the locking lever 180 to hold the locking lever 180 in the locked position of the rotor hub 127. The overall arrangement allows for a mechanical advantage of approximately 25 to 1.

The lever 132 pivots about pivot point 133, and is biased by the locking force 153, reduced as for example demonstrated by the arrow 154, to tend to move in the direction shown by the arrow to the left of lever 132. Thus, when the lever 132 is released, similar to the embodiment of FIG. 12, locking lever 180 will be forced to pivot by the force at 153, releasing the engagement of the rotor hub 127 with the surrounding housing and along the rotor hub 127 to rotate-under the force of the cable applied to the rotor hub 127.

Figures 26, 27:
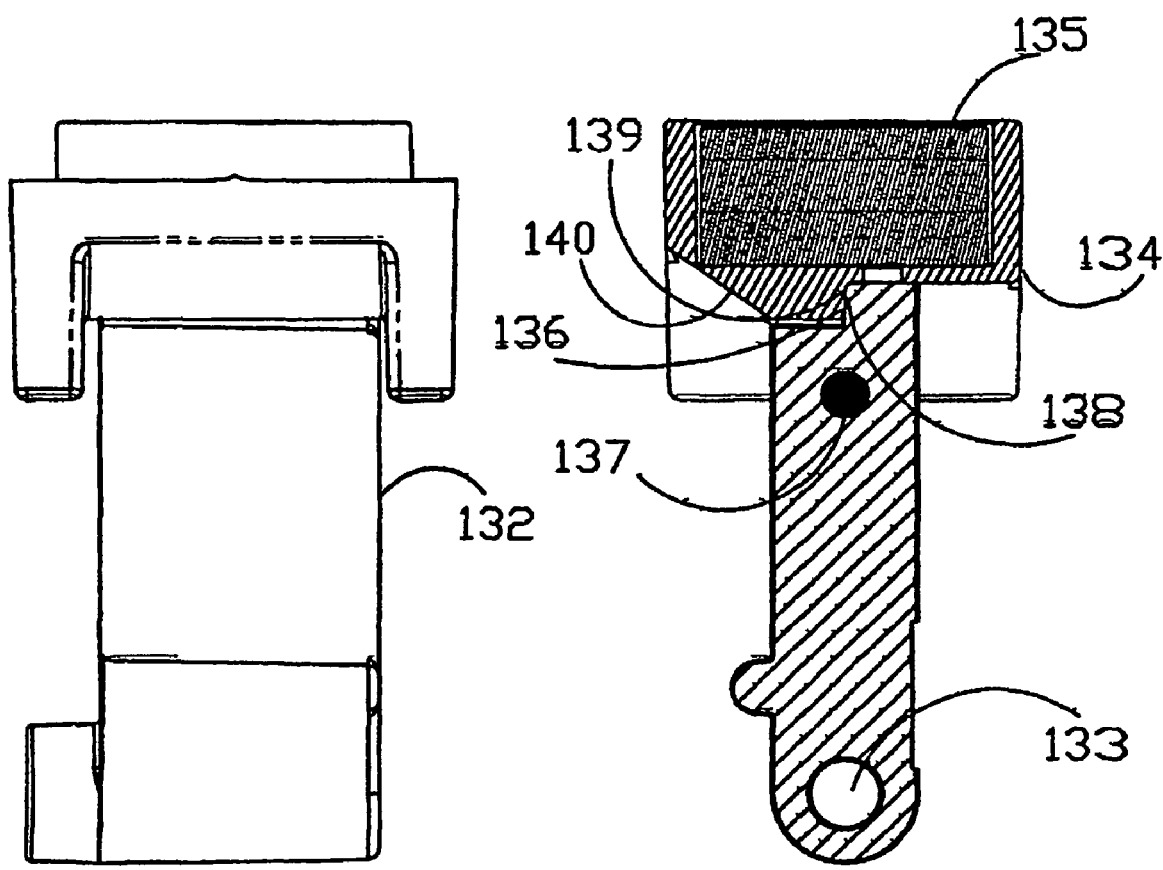
FIG. 26 is a plan view of a latch and lever used in the release mechanism of FIG. 25.
FIG. 27 is a cross-sectional view taken along a cross section of FIG. 28 as seen from the right.

Lever 132 is held in position by a latch 134. In accordance with this embodiment, the latch 134 is linearly (in this embodiment vertically) movable to release the lever 132. Note for example FIG. 27, showing the engagement of the latch 134 with the lever 132. A locking point 136 is the point at which a lever locking surface 139 of the lever 132 engages with the latch locking surface 138 of the latch 134. The latch 134 includes a magnet 135 fixed therein.

Because the latch 134 can move vertically, attraction from above can cause the magnet 135 to pull the latch 134 in the vertically upward direction to release the lever 132, allowing it to pivot as explained above. When the rotor hub 127 is rotated in the counterclockwise direction to reset the release mechanism, for example a spring, as with the embodiment of FIG. 12, causes the lever 132 to pivot clockwise and engage an angle surface 140 to push the latch 134 upward to allow the lever 130 to return to the position of FIG. 27 and re-latch. A steel pin 137 is attracted to the magnet 135, and thus helps to hold the latch 134 in the engaged position with the lever 132.

Figure 24:
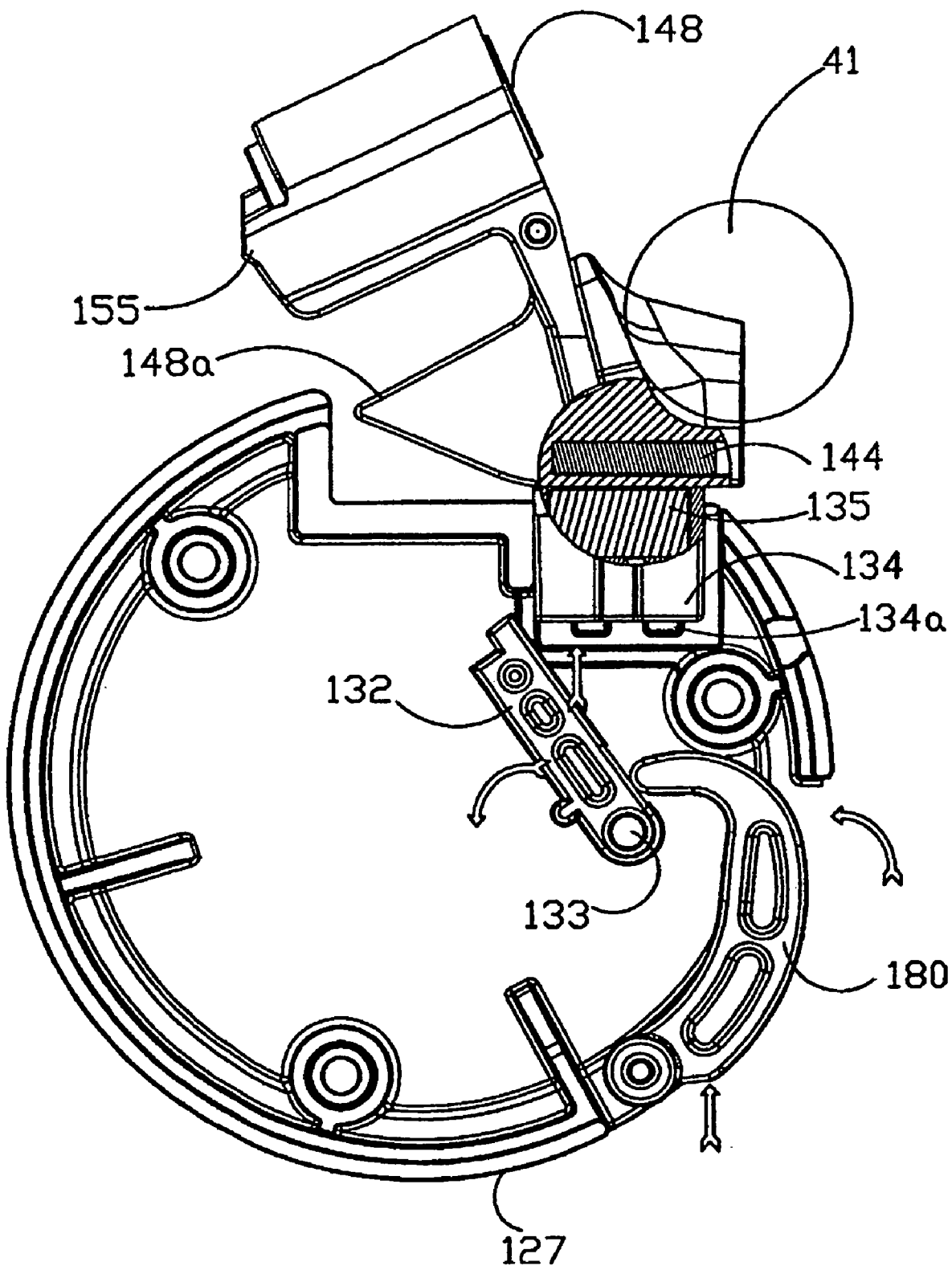
FIG. 24 shows the release mechanism of FIG. 25 in a state immediately after activation.

Turning back to FIG. 23, a ball 41 is illustrated in a position after it has fallen from its pedestal and moves slightly downward so as to begin the clockwise movement of the flapper 148 about a pivot 149. In other words, after, for example, a seismic event has caused the ball 41 to fall off its pedestal, the ball has fallen toward the right to cause a change in the force balance about pivot 149. This causes the flapper 148 as a whole to rotate clockwise. With this movement, a magnet or steel member 144 as part of the flapper 148 is moved to the position as illustrated in FIG. 24. In the position shown in FIG. 24, the magnet 144 attracts the magnet 135 of the latch 134, causing the latch 134 to slide upwardly and away from the lever 132. The latch 134 slides by way of latch guides 134a (perhaps most easily appreciated from FIG. 28). The upward sliding movement of the latch 134, as noted above, causes the latch locking surface 138 and the lever locking surface 139 to disengage from each other. The force at 153 causes the locking lever 180 to push the lever 132 in the counterclockwise direction as shown in FIG. 24. This allows the rotor hub 127 as a whole to be released and to move in the clockwise direction. After, for example, the seismic disturbance is over and it has been determined that the release mechanism may be reset, the rotor hub 127 is rotated counter-clockwise to its original position, also causing the flapper 148 to rotate back to its set position and resetting the ball 41 on its pedestal, as will be explained in more detail below.

Figure 25:
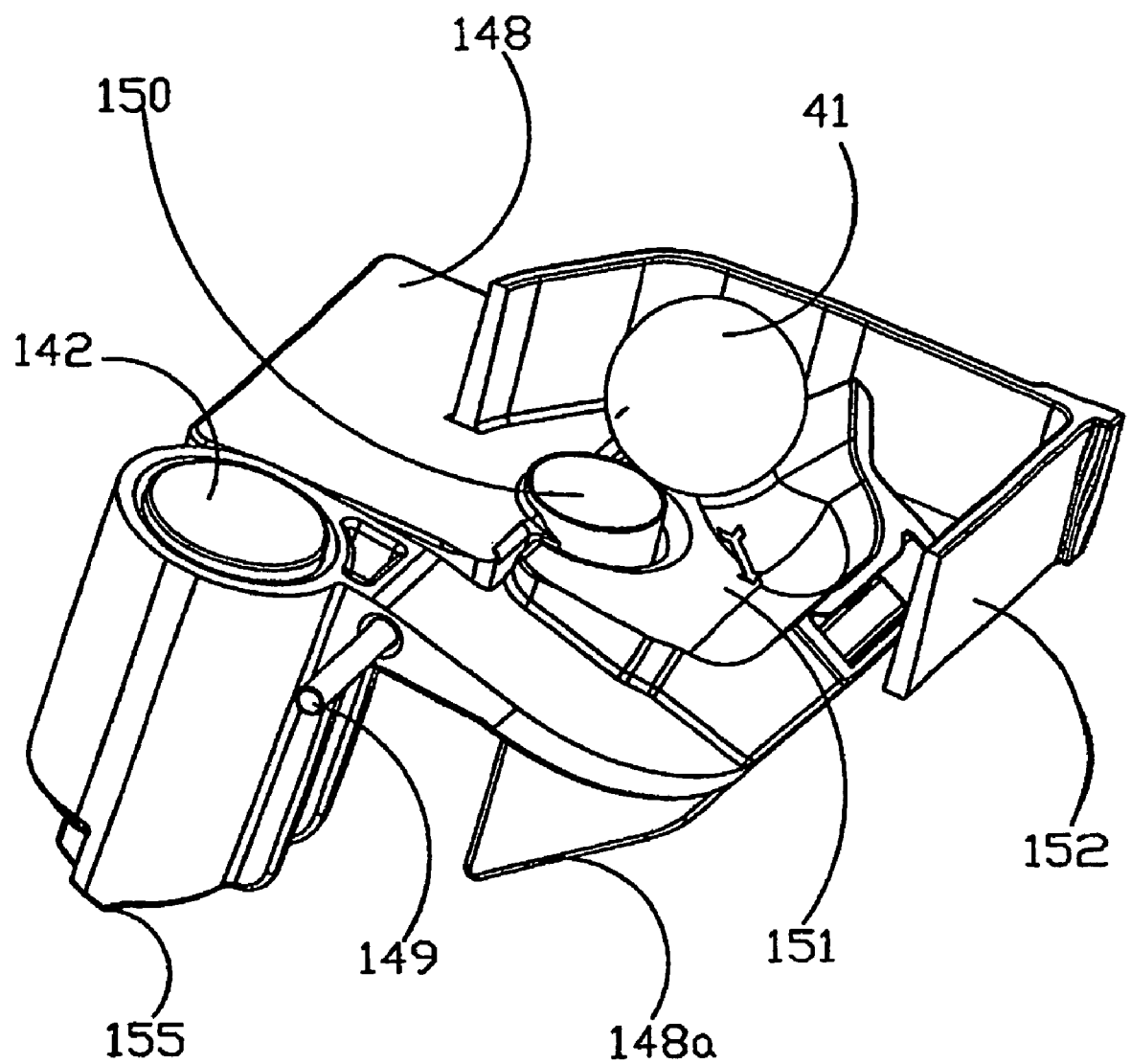
FIG. 25 is a perspective view of a flapper mechanism of the release mechanism of FIG. 25.

The flapper 148 is further illustrated in FIG. 25. Reference number 150 indicates the pedestal in this embodiment. In this embodiment, a counterweight 142 acts as a weight on one side about the pivot point 149, while the ball 41, on its pedestal 150, is already on the other side of the pivot lever 149. A sloped surface 151 is provided adjacent the pedestal so that, when the ball 41 falls from the pedestal 150, the ball falls down the sloping surface 159 to a point where its weight will overcome the weight of the counterweight 142 to cause rotation of the flapper 148.

The retaining wall 152, which is only partially illustrated in FIG. 25, surrounds the area in which the ball 41 is contained. It is constructed so that there is sufficient space for the ball 41 to come completely off of the pedestal 150; in other words, sufficient space is provided to the side of pedestal 150 so that if the ball 41 only partially leaves the pedestal 150, it will not cause the ball to be deflected to the sloping surface 151 to cause triggering.

Figure 29:
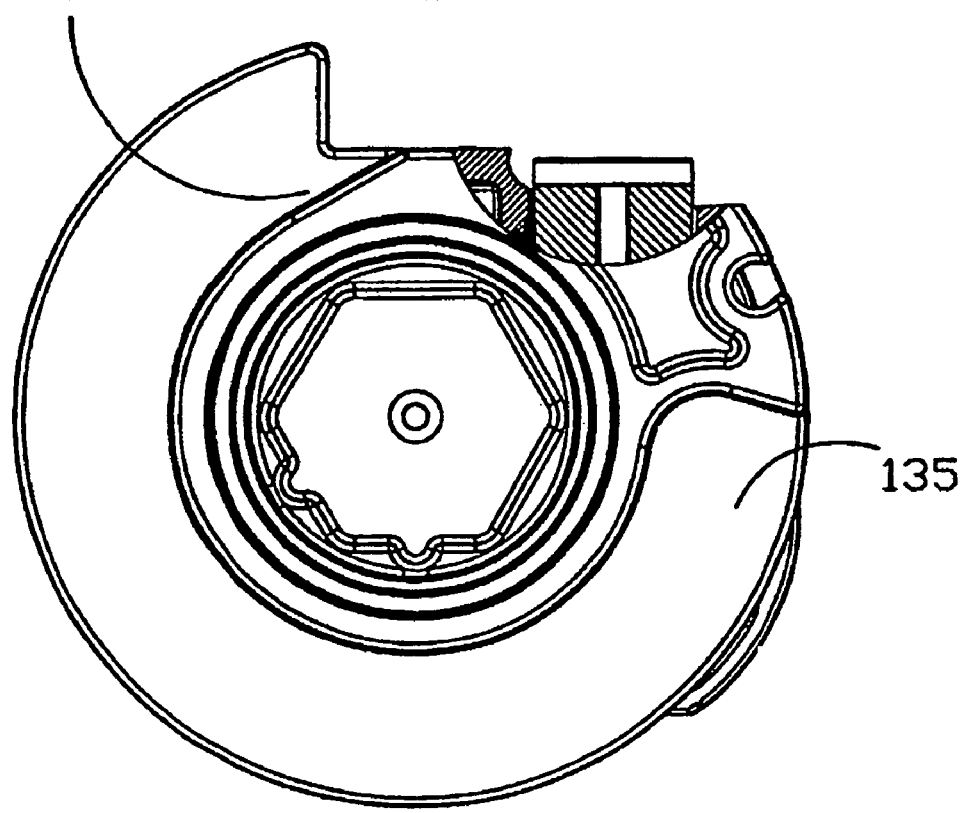
FIG. 29 is a side view of the release mechanism of FIG. 30.

Upon actuation, as the rotor hub 127 rotates from the position of FIG. 24, a flapper cam follower 148a on the flapper 148 encounters a flapper cam 148*b* on the rotor hub 127. Note for example FIG. 29, illustrating the flapper cam on a front rotor hub part 127*a*. This causes the flapper to be returned toward the position illustrated in FIG. 23. As the rotor hub 127 is rotated counterclockwise to reset the rotor hub 127 in the locked position, the flapper cam follower 148*a* rides on the flapper cam 148*b* to maintain this position, and as can be seen from FIG. 29, the flapper cam 148*b* increases in radius to cause a bump of the flapper cam follower 148*a* to ensure sufficient tilt of the flapper 148 to cause the ball 41 to reset on the pedestal 150. Further, in the set or reset position (illustrated in FIG. 23, for example, except for the position of the ball 41) the left-hand part of the flapper 148 engages the rotor hub 127 to maintain its position. Note point 155 at the position of the counterweight 142 as shown in FIG. 23. This point 155 engages with a surface of the rotor 127 so that the flapper 148 rests on the outer part of the hub, ensuring the reset position. This ensures the proper reset position in which the sloped surface 151 of the flapper 148 in fact slopes downward, ensuring that when a sufficient seismic activity, for example, causes the inertia ball 41 to leave its pedestal, it will roll in the proper direction to cause rotation of the flapper 148.

It is noted that the magnet 144 of the flapper 148 may simply be a steel plate to be attracted to the magnet 135 of the latch 134. Obviously the attraction between magnet 135 and steel plate 144 is greater than the attraction between steel pin 137 and magnet 135, and sufficient to ensure vertically upward movement of the latch 134 to release the lever 132.

Figure 28:
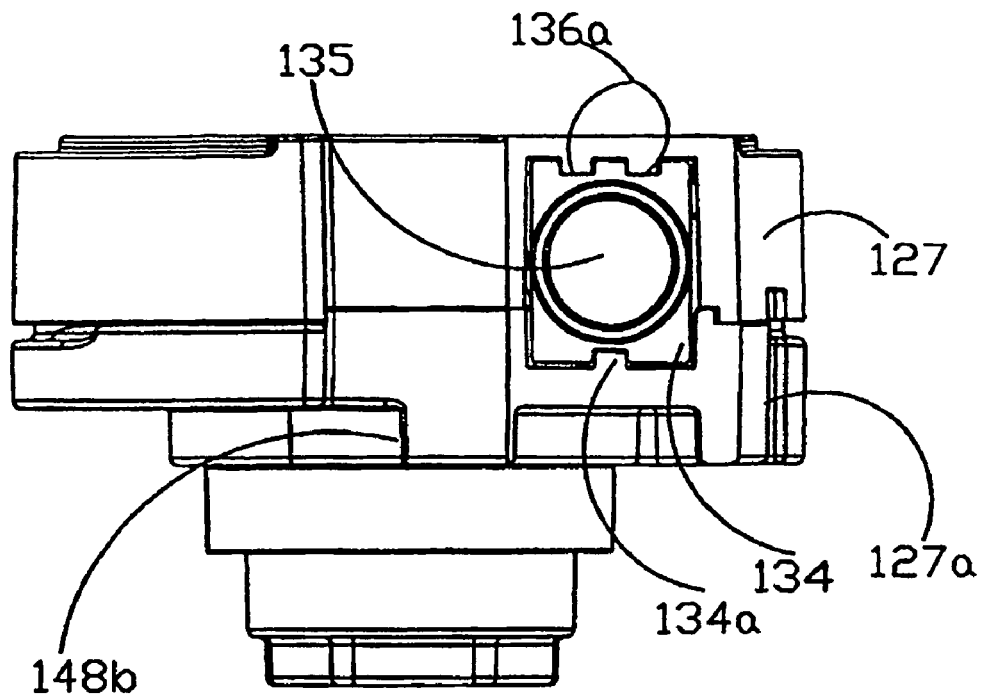
FIG. 28 is a plan view of the release mechanism of FIG. 25 with the flapper removed.

As noted above, the latch guides 134*a* are better illustrated by FIG. 28, the view taken from above. Providing corresponding guides and projections on either sides, in different number (one set 134*a* shown on the lower side and two sets 134*a* shown on the upper side) ensures that during assembly, the latch 134 will be turned the correct way when inserted into the rotor hub 127.

A particular advantage of the arrangement of the embodiment of FIGS. 23-29 is that it permits a large number of the components to be molded from plastic. That is, this arrangement requires less strict tolerances than some of the other embodiments discussed herein, allowing for the components to be less precisely made, for example, by molding from plastic. In particular, the vertically sliding latch 134 for the lever 132 allows for less stringent tolerances than might be required with the latches of the previously-described embodiments.

Figure 30:
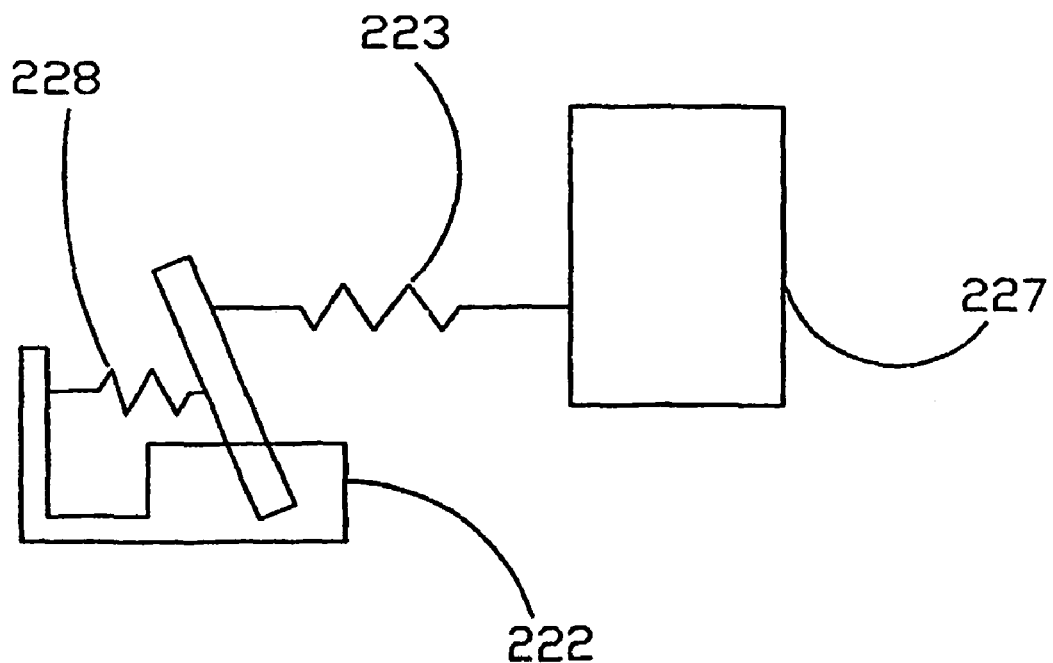
FIG. 30 is a schematic illustration of a trigger arrangement for a switch in accordance with another embodiment of the present invention in an activated position.
Figure 31:
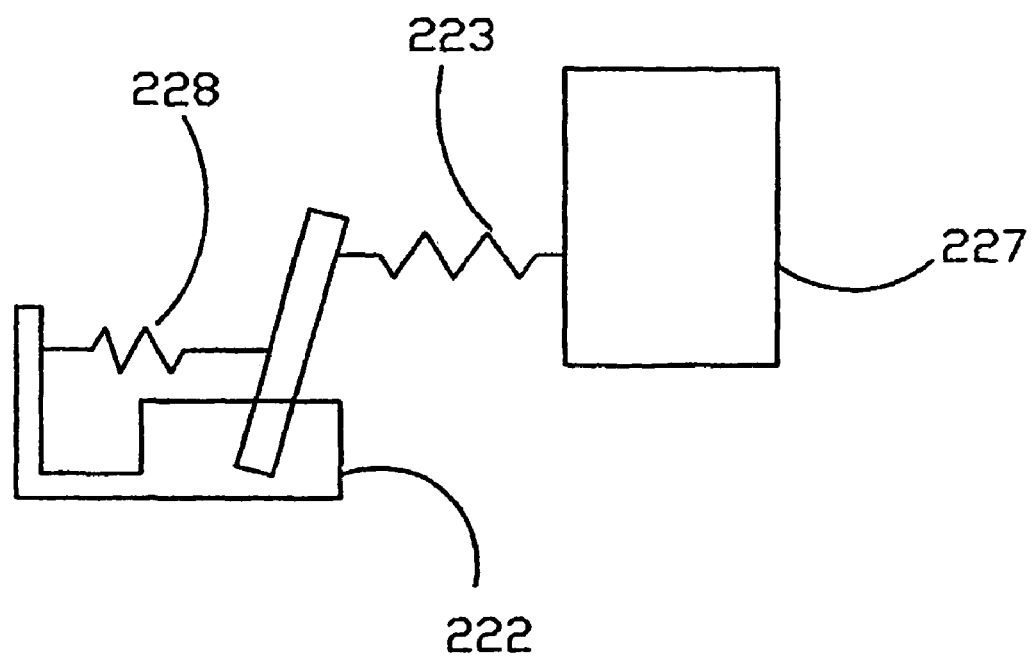
FIG. 31 is an illustration of the embodiment of FIG. 32 in a reset position.

The release mechanism according to the present invention has been described above particularly with respect to the activation of the closure of a valve upon detection of seismic activity, for example. However, the release mechanism according to the present invention can be applied in other contexts. For example, the rotor hub 27 or 127 of the above-described embodiments could be employed together with the cable 23 to actuate the opening of a circuit breaker to shutoff electricity upon the detection of, for example, a seismic event. FIGS. 30 and 31 schematically illustrate how this might be accomplished.

In FIGS. 30 and 31, reference number 222 represents a switch or circuit breaker having a movable component such as a handle. FIG. 31 illustrates the "set" position in which the rotor hub is held in locked position. FIG. 30 represents the position in which the release mechanism will trigger 227 has been actuated. A spring 228, upon actuation, forces the opening, for example, of the switch or circuit breaker 222 by the force of the spring 228 being sufficient to pull the lever or handle from the position of FIG. 31 to the position of FIG. 30.

Also illustrated in the figures, as part of the cable mechanism, is a tolerance spring 223. The tolerance spring 223 is a spring which is stronger than the spring 228. Upon actuation from the position of FIG. 31, the cable, with the spring 223, has been released by the trigger 227. Thus, neither the cable nor the spring 223 prevent the spring 228 from pulling the lever toward the left hand position of FIG. 30. However, upon reset from the position of FIG. 30, rotation of the rotor hub, for example, in the counterclockwise direction causes the cable to be pulled in toward the trigger 227 to cause the movement of the lever toward the right hand side as illustrated in FIG. 31. Because the spring 223 is stronger than the spring 228, the cable still overcomes the force of the spring 228 biasing the lever toward the left hand side.

However, as the lever reaches its end position as shown in FIG. 31, as its re-set position, at the same time, the rotor hub 127, for example is reaching its own re-set position. Because the rotor hub 127 may have to rotate slightly past the locked position to ensure that the rotor hub 127 is properly reset, the spring 223 allows for slight continued movement of the rotor hub 127 in the counterclockwise direction, without further movement of the lever of the switch 222.

While the tolerance spring 223 may not be needed as part of the cable mechanism connecting the trigger 227 to the lever of the switch 222, its presence is useful, because it allows for manufacturing to be made easier. That is, less stringent tolerances are required with the presence of the tolerance spring 223.

Figure 32:
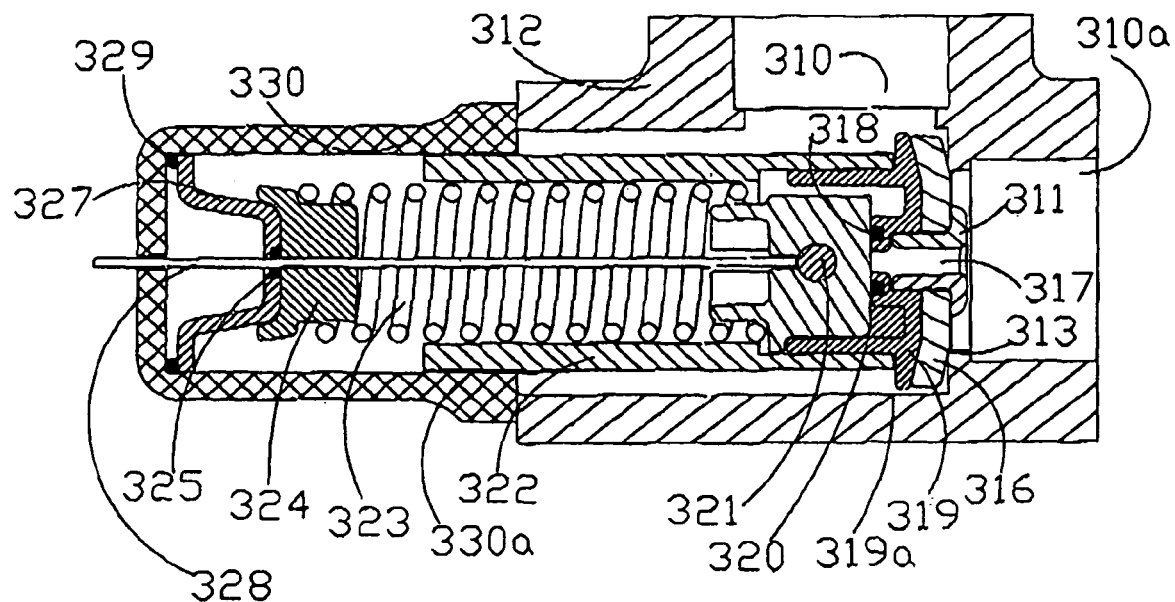
FIG. 32 is a sectional view of a valve assembly of an alternative valve.
Figure 33:
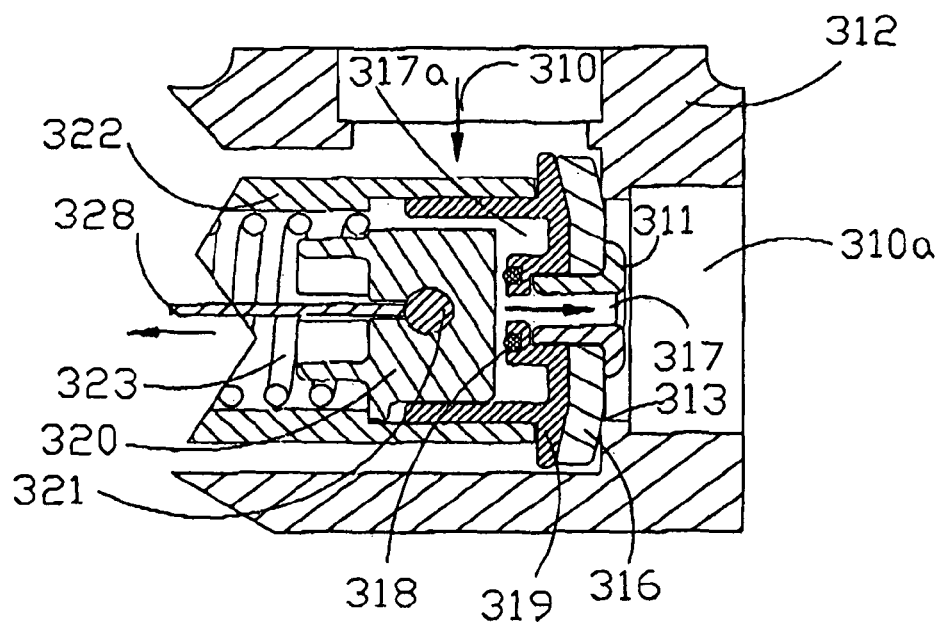
FIG. 33 is an enlarged sectional detailed view of the assembly of FIG. 32 showing operation of a bypass during resetting of the valve to an open position.
Figure 34:
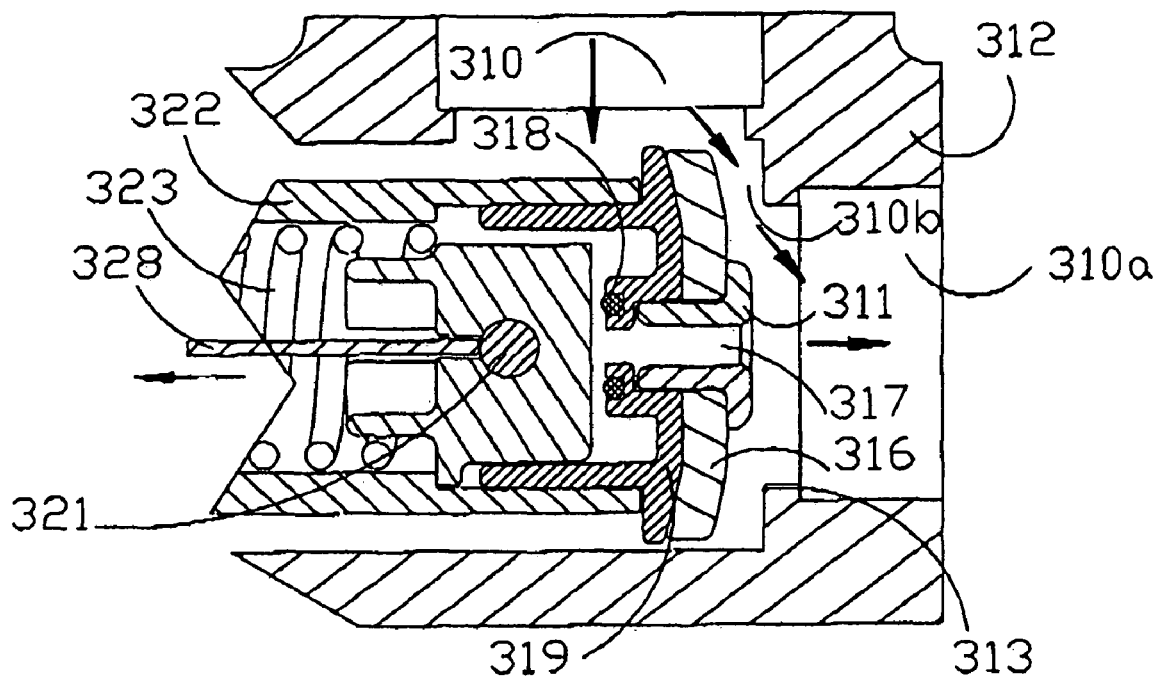
FIG. 34 is a view similar to FIG. 33 showing a stopper beginning to open.

FIGS. 32-35 illustrate another alternative structure of the valve assembly. This valve assembly can form a safety valve usable in the same manner as described above in supply plumbing for supplying a fluid medium to a point of use structure, and is usable with a mechanical actuator as described in the previous embodiments. A cable 328 as illustrated in FIG. 34, for example can correspond to the cable 23 as described above for engagement with the mechanical actuator.

A valve housing 312 has an inlet 310 and an outlet 310*a*. The housing 312 is sealed off by a cap 330. In FIG. 32, the valve is shown in the closed position with an outlet sealed off by a rubber-like stopper 316 engaging with a valve seat 313 formed in the housing 312.

A spring 323 applies a compression load sufficient to form a good leak tight seal against seat 313 and, at the same time, form and effect a seal around the cable 328 by compressing an o-ring around the cable (see FIG. 35; further described below).

A bypass is provided in order to allow for easy reset of the valve under high pressure. When the valve is in the off position, the bypass is sealed off by the compression load supplied by the spring. The spring causes a bypass piston 320, specifically, to effect a seal against a bypass seat 318.

The valve assembly has a plunger 322 which holds a stopper base 319 in place, which in turn has the stopper 316 attached thereto. The stopper 316 is held in place by a stopper holder 311 which has a bypass orifice 317. The plunger 322 assembly is guided by a plunger guide 330*a* formed within cap 330, as seen in FIG. 32. The stopper base 319 is allowed to move and is held in place by a stopper guide 319*a*. The other end of the plunger 322 assembly is guided by the stopper base 319 and the stopper base guide 319*a*.

Noting initially FIG. 33, when the cable 328 is pulled to open the valve, the bypass piston 320 will initially move away from the bypass seat 318, allowing fluid to pass through the bypass orifice 317 (the direction of fluid flow is illustrated by the arrows in FIG. 33). A bypass clearance 317*a* is provided around the bypass piston to allow the fluid to flow around the bypass piston 320. The force that is then required to open the piston will equal the spring load plus the pressure differential of the bypass piston against the bypass seat. The bypass piston 320 will open with less force than that of the stopper 316 that is sealed against seat 313, because the cross sectional area of the valve seat 313 is much larger than that of the bypass seat 318.

Noting FIG. 34, as the bypass 317 allows the pressure differential at the stopper to equal that of the spring load, the plunger assembly will then open the valve.

Figure 35:
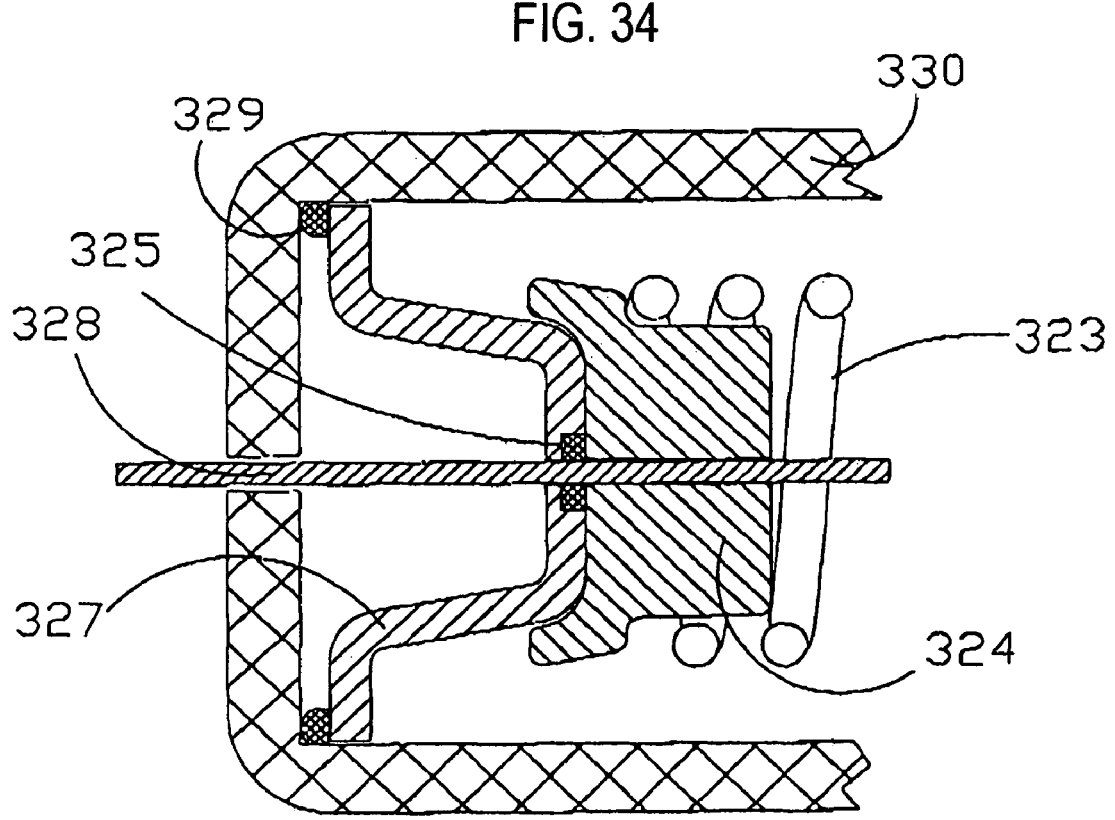
FIG. 35 is an enlarged sectional view of a cable seal of the valve assembly of FIG. 32.

FIG. 35 shows a cap 342 sealing the housing 312 off from the outside by way of a cap seal 329 and a cable seal 325. Spring 323 engages a spring guide 324, which in turn compresses the cable seal 325, which is located in a cable seal housing 327, against the cable 328. As can be seen from FIG. 35, the cap seal 329 is in turn compressed between the cap 342 and the cable seal housing 327.

The valve assembly of FIGS. 32-35 has the advantage allowing for easy resetting of the valve while providing a good seal. The spring helps to seal the valve seat 313, the bypass seat 318 and the housing cap 330. The bypass orifice 317 has a much lower pressure differential to overcome during the resetting of the valve to the open position. For example, if the valve seat is 2 inches in diameter, the cross sectional area would be approximately 3.14 square inches. If the pressure differential were 100 PSI on the inlet side of the stopper, then the force necessary to reset the valve would be 314 pounds of force. If the bypass seal has a cross sectional area of ⅛ inch, the cross sectional area would be 0.05 square inches; thus at 100 PSI, the force necessary to open the bypass would be 5 PSI. The opening of the bypass then allows the pressure differential to equalize so that the valve can be fully reset without the need for applying a much larger force at higher pressures. Such feature enables the valve to work with higher-pressure fluids, such as water. The sealing to the atmosphere around the cable, which is a smaller diameter than the plunger, also reduces the friction and makes it easier to achieve a low leakage rate.

Figure 36:
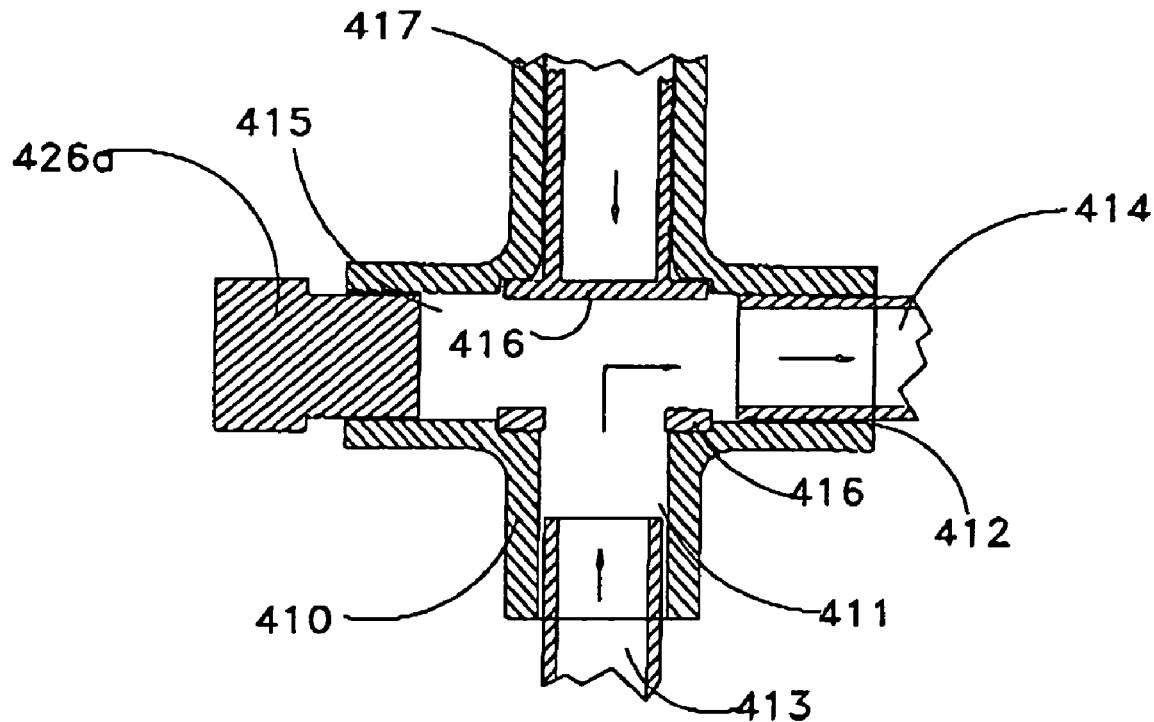
FIG. 36 is a sectional view of a valve assembly that could replace the by-pass tee in the gas system.
Figure 38:
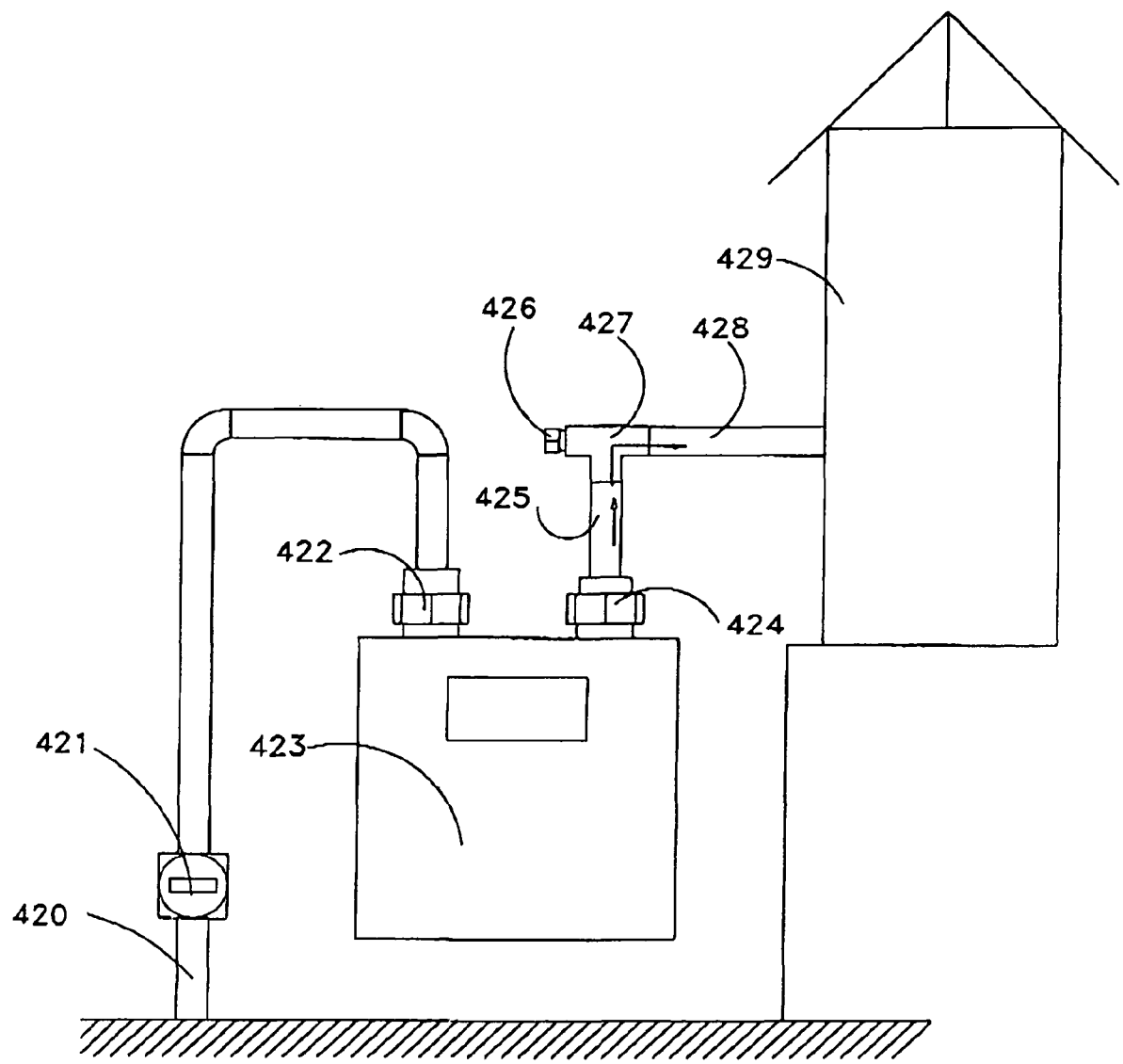
FIG. 38 is described in U.S. Pat. No. 6,705,340, incorporated herein by reference, showing a gas system and the by-pass tee and a pipe plug.

FIG. 36 is a sectional view of a valve assembly that could replace a by-pass tee in the gas system. It is composed of a valve housing 410 having an inlet 411 and outlet 412. The inlet is plumbed with a pipe fitting 413 coming from the gas meter that is shown in FIG. 38. The outlet is plumbed with the pipe fitting 414 that goes into the house as shown in FIG. 38. The valve member 416 is shown in the open position. The valve housing has an opening 415 with a pipe plug 426a. This pipe plug can be removed so it can be used with a bypass method described in U.S. Pat. No. 6,705,340. This valve arrangement would allow the by-pass method of keeping the gas on while replacing the gas meter. The by-pass would be used when the valve is in the open position. This arrangement would be very easy to install because almost all gas systems have a by-pass tee that is used by the gas utility.

Figure 37:
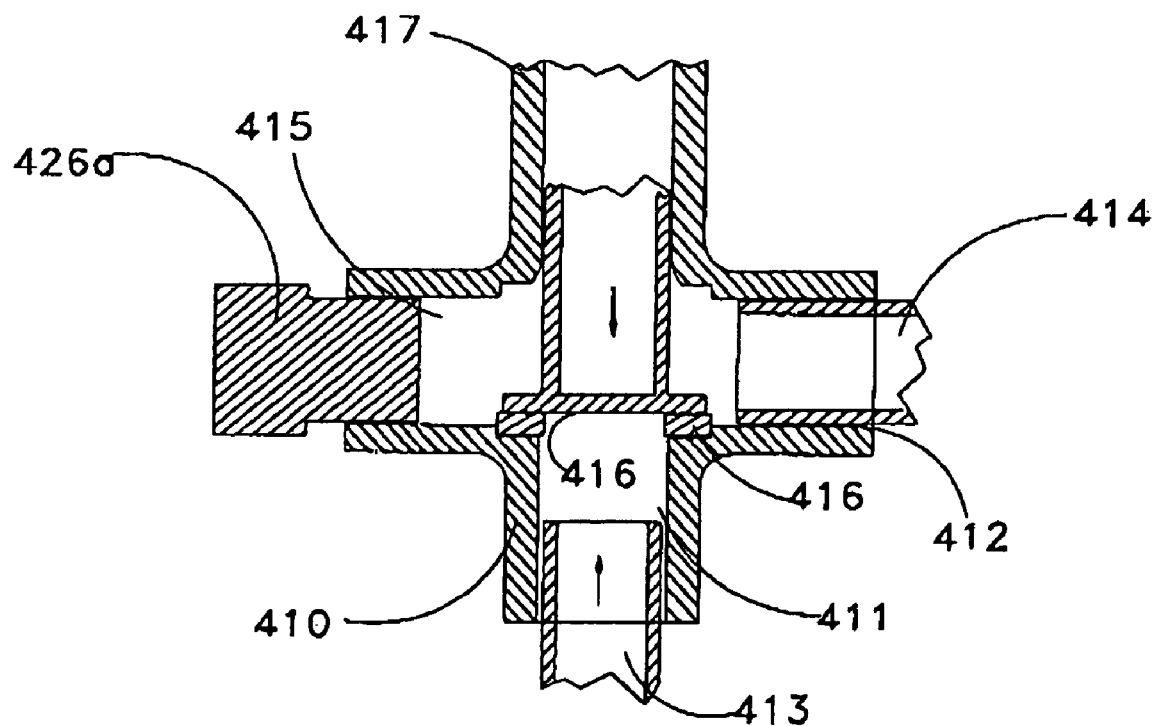
FIG. 37 is a sectional view of the valve assembly showing it in the closed position.

FIG. 37 is a sectional view of the valve assembly showing it in the closed position. The valve member 416 is sealed against a seat 416. A spring load holds the valve member in place and is stronger the gas pressure so it stays in the closed position.

FIG. 38 is described in U.S. Pat. No. 6,705,340 showing a gas system and the by-pass tee 427 and pipe plug 426.

The advantage of this arrangement is to allow for easy installation by just replacing the by-pass tee with this valve arrangement. It would allow the gas utility to use their by-pass method to service the gas meter.

The invention discussed above presents, including with respect to the various alternatives, a new approach to ensuring the inexpensive and reliable installation of safety valves at point of use structures. The actuator according to the present invention provides a standardized trigger which can work with valves of different sizes, for example from ¾ inch valves to 6 inch valves. The actuator and trigger is easily mounted on the point of use structure without requiring any bracing. The remotely positioned valve, provided in the supply pipes or plumbing, is quickly and easily installed without requiring separate leveling or other bracing to the structure. The valve is easily reset without requiring separate tools. Further, a separate manual shutoff is provided which can also be adapted to remote control in response to, for example, a heat sensor for fire detection.

Various modifications of the above-described embodiments will be apparent to those of ordinary skill in the art. Any and all such modifications should be considered within the scope of the present invention as defined by the appended claims.

I claim:

1. A valve arrangement comprising:
   a safety valve for location in supply plumbing for supplying a fluid medium to a point of use structure;
   a mechanical actuator to actuate said safety valve, said mechanical actuator being mechanically connected to said safety valve and located remotely from said safety valve, said mechanical actuator comprising a trigger housing;
   wherein said safety valve comprises a valve housing, a valve member movable in said valve housing between an open position and a closed position, and a biasing member biasing said valve member toward said closed position; and
   a valve release member that extends between said valve housing and said trigger housing;
   wherein said valve release member is movable between a valve open position, in which said valve release member holds said valve member in said open position against the force of said biasing member, and a valve closed position;
   wherein said mechanical actuator further comprises a mechanism located in said trigger housing that is operable to hold said valve release member in said valve open position thereof against the force of said biasing member and that is operable to release said valve release member from being held to allow the force of said biasing member to move said valve member to said closed position;
   wherein said mechanism of said mechanical actuator comprises a cable holder operable to hold said flexible cable in said valve open position and a cable release mechanism operable to release said cable holder from holding said flexible cable in the valve open position to allow said valve member to move to said closed position;
   wherein said cable holder comprises a movable member that is held by a detent to hold said flexible cable in the valve open position and said cable release mechanism is operable to release said movable member from being held by said detent;
   wherein said detent comprises a detent member held in place by a lever to hold said movable member and said cable release mechanism comprises a releasable latch operable to hold said lever in place to hold said movable member and to release said lever; and
   wherein said detent member comprises a locking lever that engages with a locking surface of said trigger housing of said mechanical actuator.

2. A valve arrangement comprising:
   a safety valve for location in supply plumbing for supplying a fluid medium to a point of use structure;
   a mechanical actuator to actuate said safety valve, said mechanical actuator being mechanically connected to said safety valve and located remotely from said safety valve, said mechanical actuator comprising a trigger housing;

wherein said safety valve comprises a valve housing, a valve member movable in said valve housing between an open position and a closed position, and a biasing member biasing said valve member toward said closed position; and a valve release member that extends between said valve housing and said trigger housing;

wherein said valve release member is movable between a valve open position, in which said valve release member holds said valve member in said open position against the force of said biasing member, and a valve closed position;

wherein said mechanical actuator further comprises a mechanism located in said trigger housing that is operable to hold said valve release member in said valve open position thereof against the force of said biasing member and that is operable to release said valve release member from being held to allow the force of said biasing member to move said valve member to said closed position;

wherein said mechanism of said mechanical actuator comprises a cable holder operable to hold said flexible cable in a said valve open position and a cable release mechanism operable to release said cable holder from holding said flexible cable in the valve open position to allow said valve member to move to said closed position;

wherein said cable holder comprises a movable member that is held by a detent to hold said flexible cable in the valve open position and said cable release mechanism is operable to release said movable member from being held by said detent;

wherein said detent comprises a detent member held in place by a lever to hold said movable member and said cable release mechanism comprises a releasable latch operable to hold said lever in place to hold said movable member and to release said lever; and wherein said detent member comprises a ball held in place by said lever to hold said movable member by engagement with a fixed part of said mechanical actuator.

3. A valve arrangement comprising:

a safety valve for location in supply plumbing for supplying a fluid medium to a point of use structure;

a mechanical actuator to actuate said safety valve, said mechanical actuator being mechanically connected to said safety valve and located remotely from said safety valve, said mechanical actuator comprising a trigger housing;

wherein said safety valve comprises a valve housing, a valve member movable in said valve housing between an open position and a closed position, and a biasing member biasing said valve member toward said closed position; and a valve release member that extends between said valve housing and said trigger housing;

wherein said valve release member is movable between a valve open position, in which said valve release member holds said valve member in said open position against the force of said biasing member, and a valve closed position; and wherein said mechanical actuator further comprises a mechanism located in said trigger housing that is operable to hold said valve release member in said valve open position thereof against the force of said biasing member and that is operable to release said valve release member from being held to allow the force of said biasing member to move said valve member to said closed position, wherein:

said valve release member comprises a flexible cable having one end fixed to said valve member; and said mechanism in said trigger housing comprises:

a rotor hub rotatably mounted in said trigger housing, said rotor hub having an other end of said flexible cable fixed thereto, a locking lever pivotally mounted on said rotor hub, said locking lever having a detent for engagement with a locking surface on said trigger housing such that when said detent engages said locking surface, said rotor hub is prevented from rotating to hold said flexible cable in said valve open position, wherein said locking lever is movable between a locked position in which said detent engages said locking surface and an unlocked position in which said locking lever has pivoted on said rotor hub to remove said detent from engagement with said locking surface, a lever that is pivotal between a position in which said lever holds said locking lever in said locked position and a position in which said lever allows said locking lever to move to said unlocked position, a latch that is movable between one position, in which said latch holds said lever in said position in which said lever holds said locking lever in said locked position, and a release position, in which said latch releases said lever for movement, and a seismic sensor that is operable to move said latch to said release position upon detection of seismic activity.

4. The valve arrangement of claim 3, wherein at least one of said latch and said seismic sensor comprises a magnet and the other of said latch and said seismic sensor comprises material that is magnetically attractable by said magnet, and said seismic sensor comprises a flapper that is movable to a position upon detection of seismic activity in which said magnet attracts said material to move said latch to said release position.

5. A valve arrangement comprising:

a safety valve in supply plumbing for supplying a fluid medium to a point of use structure, said safety valve comprising a valve housing, a valve member movable in said valve housing between an open position and a closed position, and a biasing member biasing said valve member toward said closed position;

a mechanical actuator to actuate said safety valve, said mechanical actuator being mechanically connected to said safety valve and located remotely from said safety valve, said mechanical actuator comprising a trigger housing; and a valve release member that extends between said valve housing and said trigger housing and that is movable between a valve open position, in which said valve release member holds said valve member in said open position against the force of said biasing member, and a valve closed position, said valve release member comprising a flexible cable having one end fixed to said valve member; and wherein said mechanical actuator further comprises a mechanism located in said trigger housing that is operable to hold said flexible cable in said valve open position thereof against the force of said biasing member and that is operable to release said valve release member from being held in said valve open position to allow the force of said biasing member to move said valve member to said closed position, said mechanism in said trigger housing comprising:
a rotor hub rotatably mounted in said trigger housing, said rotor hub having an other end of said flexible cable fixed thereto,
a locking lever pivotally mounted on said rotor hub, said locking lever having a detent for engagement with a locking surface on said trigger housing such that when said detent engages said locking surface, said rotor hub is prevented from rotating to hold said flexible cable in said valve open position, wherein said locking lever is movable between a locked position in which said detent engages said locking surface and an unlocked position in which said locking lever has pivoted on said rotor hub to remove said detent from engagement with said locking surface,
a lever that is pivotal between a position in which said lever holds said locking lever in said locked position and a position in which said lever allows said locking lever to move to said unlocked position,
a latch that is movable between one position, in which said latch holds said lever in said position in which said lever holds said locking lever in said locked position, and a release position, in which said latch releases said lever for movement, and
a seismic sensor that is operable to move said latch to said release position upon detection of seismic activity;
wherein at least one of said latch and said seismic sensor comprises a magnet and the other of said latch and said seismic sensor comprises material that is magnetically attractable by said magnet, and said seismic sensor comprises a flapper that is movable to a position upon detection of seismic activity in which said magnet attracts said material to move said latch to said release position.

* * * * *